United States Patent [19]

Cheng

[11] 4,128,994

[45] Dec. 12, 1978

[54] REGENERATIVE PARALLEL COMPOUND DUAL-FLUID HEAT ENGINE

[75] Inventor: Dah Y. Cheng, Palo Alto, Calif.

[73] Assignee: International Power Technology, Inc., Sunnyvale, Calif.

[21] Appl. No.: 705,355

[22] Filed: Jul. 14, 1976

Related U.S. Application Data

[63] Continuation-in-part of Ser. No. 534,479, Dec. 19, 1974, Pat. No. 3,978,661.

[51] Int. Cl.[2] .......... F02C 7/00; F02C 7/10

[52] U.S. Cl. .......... 60/39.05; 60/39.53; 60/39.55

[58] Field of Search .......... 60/39.02, 39.05, 39.18 B, 60/39.19, 39.52, 39.53, 39.55; 431/4, 190

[56] References Cited

U.S. PATENT DOCUMENTS

| | | | |
|---|---|---|---|
| 2,469,678 | 5/1949 | Wymann | 60/39.28 R |
| 3,238,719 | 3/1966 | Harslem | 60/39.55 |
| 3,657,879 | 4/1972 | Ewbank et al. | 60/39.05 |
| 3,693,347 | 9/1972 | Kydd et al. | 60/39.05 |

*Primary Examiner*—Louis J. Casaregola
*Attorney, Agent, or Firm*—Limbach, Limbach & Sutton

[57] ABSTRACT

A regenerative, parallel-compound, dual-fluid heat engine is set forth wherein important engine parameters are specified and linked to each other in a manner which maximizes engine efficiency and throughput for an engine of this type.

23 Claims, 33 Drawing Figures

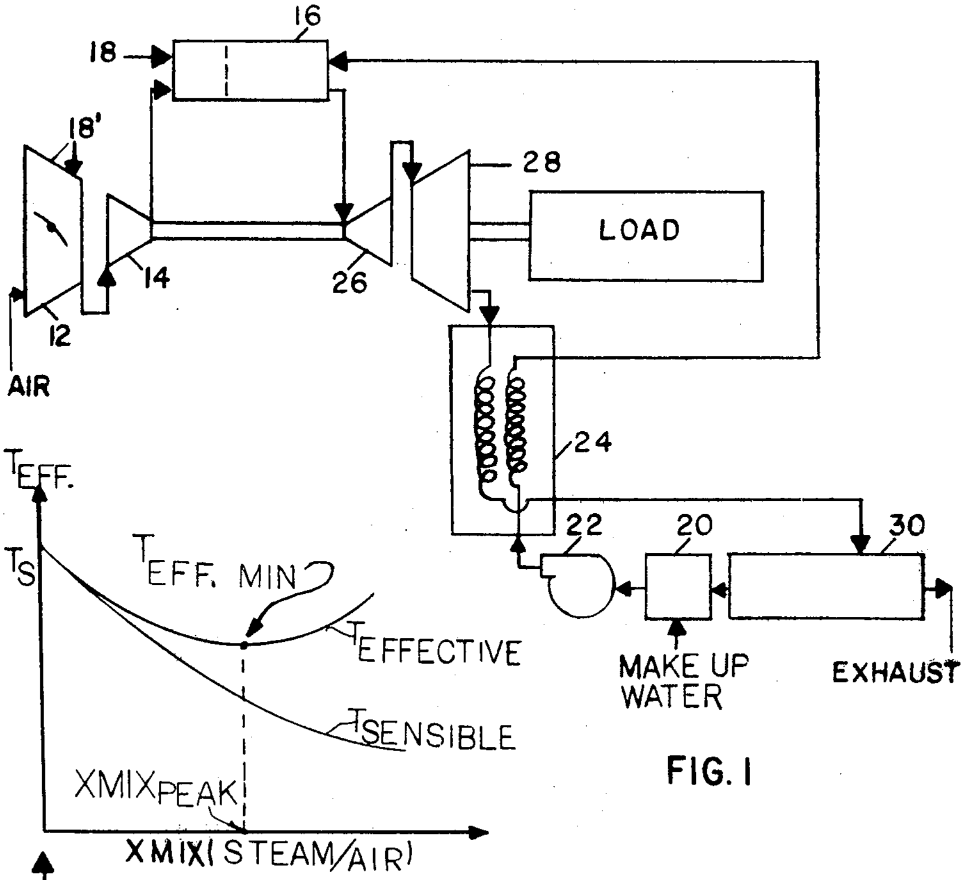
FIG. 1
FIG. 2b
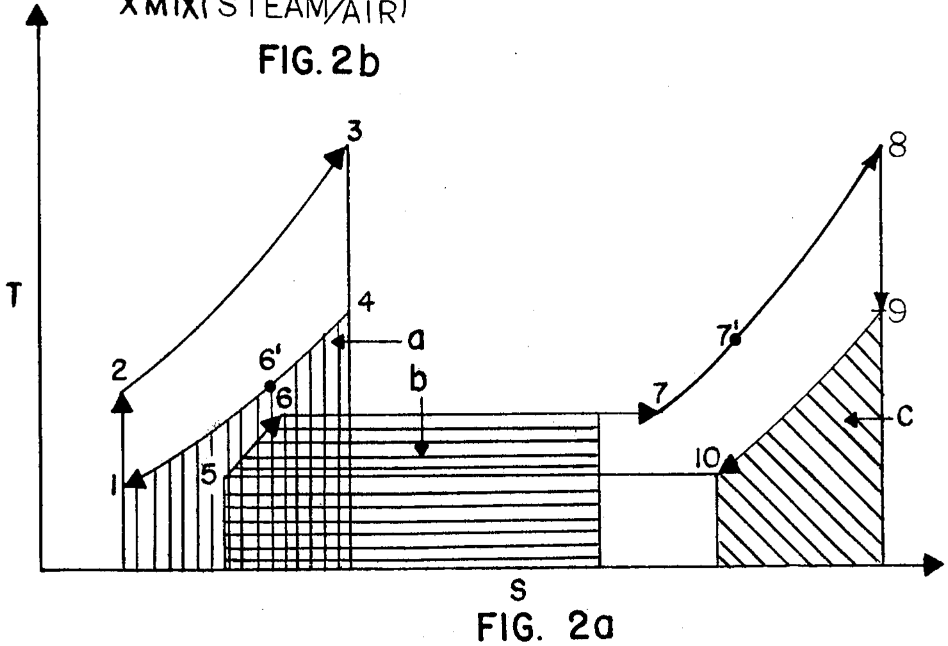
FIG. 2a

TURBINE INLET TEMPERATURE

INFLUENCE OF COMPRESSOR EFFICIENCY

INFLUENCE OF HEAT EXCHANGER BACK PRESSURE

DUAL-FLUID REGENERATIVE CYCLE PERFORMANCE

REGENERATIVE PARALLEL COMPOUND DUAL-FLUID HEAT ENGINE

RELATED APPLICATIONS

This is a continuation-in-part of U.S. patent application, Ser. No. 534,479 filed Dec. 19, 1974 (U.S. Pat. No. 3,976,661) entitled "Parallel-Compound Dual Fluid Heat Engine" by Dah Yu Cheng.

BACKGROUND OF THE INVENTION

The present invention relates to heat engines and, more particularly, to a dual working fluid engine with improved thermal efficiency and throughput.

U.S. patent application Ser. No. 534,479 entitled "Parallel-Compound Dual Fluid Heat Engine" referenced above describes a heat engine, which is referred to herein as a dual fluid or Cheng cycle engine, which makes use of two separate working fluids. Each fluid is compressed separately, but they are combined in a single mixture for expansion and heat regeneration. This cycle essentially combines a Brayton cycle and regenerative Rankine cycle system in parallel such that operational limitations of compression ratio in the Brayton cycle, upper temperature in the Rankine cycle, and waste heat rejection in both cycles are removed. Regeneration using the Rankine cycle working fluid is another, very important, feature of this cycle.

Gas turbine (Brayton cycle) and steam turbine (Rankine cycle) engines each have their own advantages and disadvantages. These are discussed at pp. 6–10 of the patent application referred to above and are incorporated herein by reference.

The dual fluid engine at first glance has similarities with the combined cycle, regenerative gas turbine cycles, and water injected gas turbine cycles. The following briefly describes these cycles and makes clear the distinction between them and the dual fluid cycle engine.

COMBINED CYCLE POWERPLANT

The combined cycle integrates the Brayton and Rankine cycles but only in the sense that the two cycles operate in series. The waste heat from the Brayton cycle is used as the heat to boil the water in a separate Rankine cycle. No mixing of the two working fluids takes place, and useful output work is developed by each cycle in separate turbines.

The combined cycle has separate loops for the working fluids with two separate and distinct power turbines, whereas the dual fluid cycle mixes the working fluids and requires a single power turbine. The steam boiler of the combined cycle is very similar to the regenerative heat exchanger in the dual fluid cycle in that both are subject to the same temperature constraints, at the hot end and at the neck. However, the combined cycle places significant limitations on this heat exchanger. The water in a combined cycle must be heated high enough into the super-heated steam region at the boiler discharge such that super-heated steam is maintained throughout the expansion through the turbine. No such requirement exists for the dual fluid cycle engine since even wet steam leaving the heat exchanger will be converted to super-heated steam in the combustor. However, a different restriction is imposed on the dual fluid cycle engine depending upon the requirements of high efficiency or high throughput, as explained subsequently.

REGENERATIVE GAS TURBINE POWERPLANTS

The similarity between the dual fluid cycle and the regenerative gas turbine cycle exists only in the sense that both regenerate the waste heat from the power turbine back into the cycle. However, the regenerative gas turbine has only one working fluid, and the regeneration is accomplished by preheating the compressor discharge air just before combustion. The regeneration puts a constraint on the engine compression ratio because the gas temperature at the turbine ratio because the gas temperature at the turbine exhaust must be greater than the air temperature at the compressor discharge. For efficient operation, this temperature difference must be significant, and as a result there are diminishing returns when regeneration is incorporated into a Brayton cycle having a high compression ratio.

In addition, the single working fluid requires a complicated mechanical scheme for heat transfer since the location of the compressor and turbine discharge points are physically separated within the powerplant. Either the compressor discharge air must be ducted to a heat exchanger at the turbine exit and then to the combustor or the turbine discharge gas must be ducted to a heat exchanger at the compressor discharge and then back through a nozzle. No such mechanical complication is necessary for the dual fluid cycle since the regeneration is done between the two working fluids, and the heat exchanger is easily located in close proximity to the gas mixture discharge from the power turbine.

WATER INJECTED GAS TURBINE POWERPLANTS

It has long been recognized that injection of water into gas turbine powerplants is an effective means of combustor cooling. In addition, this is a relatively simple means of power or thrust augmentation. In particular, this scheme was used in early aircraft turbojet engines for thrust augmentation during takeoff. The similarity of the water-injected gas turbine cycles with dual fluid cycle is only in the sense that two working fluids are used in the turbine together.

Although both use the same two working fluids, water and air, the operation and design of water injected gas turbines and the dual fluid cycle powerplant is completely different. In water injected gas turbines, water can be injected either at the front or at the exit end of the compressor or directly into the combustor for cooling with no regeneration of the waste heat from the cycle into the water. Water is particularly effective as a coolant because of its large latent heat of evaporation. However, since there is no regeneration, the process has a negative or little effect on thermal efficiency.

An added purpose of water injection is to provide thrust or power augmentation for short periods only. This is accomplished by the increased mass flow through the turbine or thrust nozzle. Since the engine is not designed for continuous operation with water, the amount of water that can be added to the cycle is limited by the stall characteristics of the compressor.

In direct contrast, the dual fluid cycle powerplant is designed for continuous operation with steam created by the regenerative of heat that would otherwise be wasted from the cycle. It is important to recognize that the Rankine cycle fluid in the dual-fluid cycle is a working fluid and not a coolant. As will be seen, the proper combination of cycle parameters to achieve high thermal efficiency in the dual-fluid cycle engine of the present invention results in an increased water-to-air ratio as the design point turbine inlet temperature is increased. In prior water ingested gas turbine designs, increased turbine inlet temperature always results in a reduced water-air ratio.

GAS TURBINE WITH WATER INJECTION AND AIR-WATER HEAT REGENERATION

A more recent application of water injection in gas turbines is for the purpose of air pollution control. Water is injected into the air stream after the compressor to the point of saturation. If a regenerator is used, water is injected before the entrance of the heat exchanger in the proper amount (less than 8%) so that the water completely evaporates. The air-stream mixture then recovers the exhaust heat before it enters the combustion chamber. The effect of the steam is to dilute the air so that the flame temperature in the combustion chamber is lowered. The $NO_X$ formation of a gas turbine is a strong function of the local flame temperature within the combustion zone, and thus, the result of $NO_X$ water injection is a reduction in the $NO_X$ level.

It is known that the specific heat capacity of steam is about twice that of air. Also, the specific heat capacity of water is about twice that of steam. For this reason, heat recovery in water without air is far more effective than heat recovery in a steam-air mixture. In addition, the same pressure ratio limitation imposed on a regenerative gas turbine applies to the air-stream regenerative system. The optimum pressure ratio is usually about 6 to 1. Although the cycle can increase throughput and also be slightly better in efficiency, it is far less than the Cheng cycle engine in both throughput and efficiency.

STEAM INJECTED TURBINE HEAT ENGINE

Turbine heat engines designed to inject steam with some degree of heat regeneration have been attempted in the past, but with failure or disappointing results in terms of efficiency. In fact, efficiencies have been sufficiently low that the series combined cycle engines have been more attractive and have found commercial utilization.

Several attempts have been made to improve the steam injected gas turbine efficiency with some degree of heat recovery from the engine exhaust. No one, however, has recognized ths engine system as the linking of two independent thermodynamic cycles and that the checks and balances of cycle parameters for such an engine are interlocked. Thus, the combination of the two cycles and engine design parameters are unique as with any other thermodynamic cycle. It has not been recognized that the cycle parameters are limited to a narrow operating range and only in that narrow range can high efficiency be realized.

For example, too much steam results in a poor steam cycle because it lacks the high pressure ratio of a pure steam cycle. Too little steam results in an engine little different from a regenerative gas turbine.

Generally, in any thermodynamic heat engine cycle or system, the engine operating parameters are interdependent and are locked into a narrow operating range for maximum throughput or efficiency. An analysis of the prior art in gas turbines with regeneration and steam injection indicates a failure to recognize this interdependence. If the interdependence was recognized, then the narrow range of allowable and independent engine parameters that maximize engine efficiency was not found.

SUMMARY OF THE INVENTION

In accordance with the present invention, a regenerative, parallel-compound, dual-fluid heat engine is provided wherein important engine cycle parameters are identified and linked together to maximize efficiency and/or throughput. These parameters include the turbine inlet temperature, the overall cycle pressure ratio, specific heat input rate i.e., Btu/lb of gas flow (or air-fuel ratio), and the ratio of the Rankine cycle working fluid to the Brayton cycle working fluid.

It will be shown, with examples of air (for simplicity, humidity of ambient air and combustion products are neglected) and water as the working fluids, that the proper choice of these parameters for the regenerative parallel-compound, dual-fluid heat engine of the present invention results in a powerplant far superior in terms of thermal efficiency (and thus fuel consumption) compared to any state of the art stationary powerplant. Thermal efficiency greater than 52% can be achieved using state of the art gas turbine component technology, and efficiencies of 60% can be realized using advanced high pressure ratio and high temperature technology.

It should be emphasized that the operation of an engine using two working fluids simultaneously is not being claimed as unique to this invention. Rather, the proper choice of cycle parameters or the unique matching of components' sizes to attain high efficiency or throughput and the operational limits of the regeneration parallel compound dual-fluid cycle are the unique teachings of this invention to the state of the art in heat engines.

The proper combination of cycle parameters for the regenerative parallel-compound dual fluid cycle results, surprisingly, in an increased proportion of liquid (such as water) relative to gas (such as air) as turbine inlet temperature is increased. This is a major distinction of this cycle from the prior art in which injected gas turbine powerplants. In the past, the critical relationship between cycle parameters to achieve high efficiency was not recognized, and increased turbine inlet temperature resulted in reduced water-air ratios because the air-fuel ratio was not set in the proper proportion.

It has also been found that efficiency is related both to the degree of superheated temperature or quality of the regenerated steam, facts not heretofore known. It has been found that efficiency is maximized when the steam entering the combustion chamber is superheated and is at a maximum superheat temperature and maximum waste heat recovery. This maximum temperature is limited by the turbine exhaust temperature. "Degrees of superheat" is defined as the temperature above the boiling temperature of a liquid at a given pressure. The "quality of steam" is defined as the percentage of vapor by mass versus liquid in a wet steam as they are mixed at a constant boiling temperature. Thus, the compression ratio directly influences the degree of superheat or "quality". Increasing the pressure ratio reduces the degree of superheat but too high a pressure ratio places an unwarranted burden on the compression work of the Brayton cycle. This is a fine example of how the proper choice of cycle parameters influences the efficiency of this new cycle.

It has also been found that maximum efficiencies only occur when the engine parameters other than the compression ratio are within a narrow region of permissible values. Maximum efficiency must always be balanced against engine throughput considerations, and hence a practical engine may operate slightly away from the maximum superheated regenerated steam to gain some throughput. The quality of the steam does define a lower boundary for the engine operation for maximum throughput, if the cycle receives heat externally, but is also limited by stoichiometric ratio if a fuel is burnt internally.

BRIEF DESCRIPTION OF THE DRAWINGS

FIG. 1 is a block diagram of a dual-fluid or Cheng cycle heat engine;

FIG. 2(*a*) is a graphical illustration of the temperature-entropy (T-S) diagram of the two working fluids of the dual-fluid, heat engine of FIG. 1; FIG. 2(*b*) is a graphical illustration of the parameter of effective temperature in a dual-fluid engine;

FIG. 27(*b*) illustrates a range of air-fuel ratios (and specific heat input rates) as a function of the turbine inlet temperature for practical operation of a dual-fluid cycle heat engine;

DESCRIPTION OF THE PREFERRED EMBODIMENT

Figure 3:
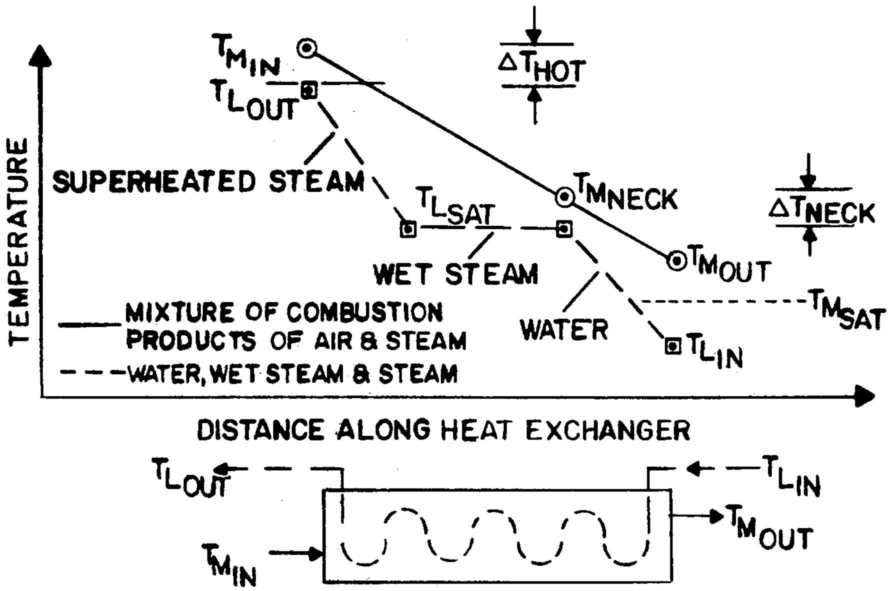
FIG. 3 is a block diagram showing the relative temperature levels on both sides of the heat exchanger illustrated in FIG. 1.

FIG. 1 is a block diagram of one embodiment of a dual-fluid or Cheng engine 10 in accordance with the present invention. The engine typically uses air as the first working fluid. Fuel combustion with the air is a typical source of energy, and water is a typical second working fluid. Air enters a throttle 12 to regulate the air pressure prior to entering a compressor 14 where it is adiabatically compressed. If the compression ratio of the compressor is below 12:1, the throttle 12 can also serve as a carburetor with some of the fuel being introduced into the throttle as indicated by 18'. If the compression ratio of compressor 14 is greater than 12:1 without special cooling, spontaneous combustion would result within the compressor if an air/fuel mixture were compressed. For high compression ratios, the fuel must be introduced after compression at 18.

Compressor 14 can be of any type, but for a high volume flow rate machine a standard axial flow or centrifugal flow air compressor, equivalent to those used in conventional gas turbine engines, is desirable.

From the compressor 14, the air or air/fuel mixture enters the combustion chamber 16. Where fuel has not been introduced into the air flow through the compressor 14 or where additional fuel is desired, it is introduced directly into the combustion chamber at 18. Through combustion, heat is added to the air; the combustion products thus heated constitute the first working fluid of heat engine 10.

The first working fluid can be heated in other ways besides combustion; for example, by solar energy or nuclear energy in combination with a heat exchanger in place of the combustor. For the remainder of this description, it is assumed that the first working fluid is heated by combustion. Regardless of the source of heat, the amount of heat added is referred to herein as the Specific Heat Input Rate (SHIR) which is heat input per pound of first working fluid flow.

The combustor 16 design can be of the conventional annular or co-annular type used in gas turbine engines today. However, the region downstream of the combustion zone must be modified to inject high pressure superheated steam in a way to promote good mixing with the combustion products of air. It may be possible to employ more novel combustor designs which would utilize the steam as an ejector for minimizing pressure losses. Mixing would take place in a way similar to that by which diluent air mixes with the primary zone combustion products in a conventional combustor.

Water, the second working fluid, is compressed to a high pressure by pump 22. The high pressure water enters heat regenerator 24 where waste exhaust heat is absorbed from the steam/combustion product mixture exhausted from the expander 28. As will be described in greater detail subsequently, the water is heated to vapor. In most cases the steam is superheated, however, it is possible for wet steam to discharge from the heat regenerator. Because of the latent heat of evaporation of water, much of the heat absorbed by any water converted to steam is absorbed at essentially constant temperature, i.e., boiling temperature.

The heated steam or steam/water mixture from the regenerator 24 then enters the combustion chamber 16. To help cool the combustion chamber walls, the steam can first pass through water jackets in the wall of the combustion chamber. Any wet steam into or just after the combustion chamber is rapidly evaporated into superheated steam. Transfer of thermal energy from the heated combustion products to the steam is accomplished through turbulent mixing of the two working fluids. The water vapor is mixed with the combustion products only after combustion is completed so that the steam does not quench the combustion process. The steam, however, is used to control the temperature of the combustion products to reach a designed turbine inlet temperature, as will be described in greater detail subsequently.

The mixture of the two working fluids then enters an expander or core tubine 26, which drives the compressor 14, then enters another expander or work turbine 28. These expanders convert the thermal energy of the two working fluids into mechanical work, to drive the compressor 14 and to produce net work output.

Both the core turbine 26 and the work turbine 28 are conventional in the sense that they are typical reaction turbine designs. However, they must be speicifically designed for the gas mixture of combustion products of air and steam because the specific heat ratio and the average density of the gas mixture will change depending upon the mixture ratio. This presents no problem in the aerodynamic design of the turbine in terms of flow path areas and blade profiles as long as the compression ratio, maximum inlet temperature, and the Specific Heat Input Rate are known. There must be a careful materials selection to withstand high temperature; however, it is entirely feasible to use a portion of the steam for film cooling in the turbine to replace the compressor bleed air as used in conventional high temperature gas turbines.

Heat exchanger 24 used to regenerate the waste heat from the cycle is a counter flow heat exchanger. The gas side of the heat exchanger contains the gas mixture which drops in temperature from the power turbine 28 discharge to a temperature at or above the saturation temperature of the water in the gas mixture. This saturation temperature is a function of the partial pressure of the steam in the gas mixture. On the liquid side of the heat exchanger, water under pressure is heated from approximately ambient temperature to boiling temperature where it is evaporated. Wet steam then forms in the water-steam mixture region, and if sufficient heat transfer from the gas mixture exists super-heated steam results at the heat exchanger discharge.

From the heat exchanger 24 the gas mixture is discharged into the condenser 30. The water vapor in the gas mixture is at or somewhat higher than saturation temperature. The condenser 30 is a typical water-vapor design such as that now in use at some geothermal power installations to condense steam to water. The gas mixture is ducted to a closed vessel which has water being injected from the top from shower heads. The water droplets absorb the heat from the gas mixture and the water in the mixture condenses and drops to the bottom of the vessel with the cooling water. The remaining gas is vented from the top of the vessel to the atmosphere.

After some purification at the water system 20, the proper amount of water is metered and pumped to the liquid side of the heat exchanger for regeneration ahead of the combustor. The remaining water is passed through a cooling tower or other cooling means and then reused in the condenser.

The two working fluids, water and air products, thus follow parallel cycles with the two fluids being mixed prior to the expansion part of the cycle. Since the two fluids are mixed, the output of each is added together, i.e., compounded.

The heat energy source used by the dual fluid engine as disclosed by this invention is not limited as to fuel type or means of heat input. Hydrocarbons, fuel gases produced by conversion of coal, or alcohols can be used. In addition, as described above, concentrated solar energy or a nuclear reaction also could be the source of heat. However, each fuel will have its own "best" set of engine operating conditions and cycle parameters. To simplify the descriptions and explanations offered here, all cycle descriptions and operating parameters of the dual fluid engine are given in terms of a typical hydrocarbon fuel with air and water as the two working fluids. Extension to other working fluids such as helium, Freon, etc., and using nuclear heat sources can be accomplished by established engineering principles, well known to those skilled in the art.

The following subparagraphs summarized the thermodynamic cycle of the regenerative, dual-fluid heat engine of the present invention.

1. Compression of the two fluids takes place separately. Air is compressed from atmospheric pressure up to the maximum cycle pressure by compressor 14. Water is pumped at ambient temperature to a pressure somehwat greater than the compressor discharge air pressure.

2. Combustion takes place in a mixture of air and a suitable fuel in combustor 16. For these examples and illustrative figures, a hydrocarbon fuel is assumed. Water, in the form of superheated steam, is then mixed with the combustion products of air. This steam is the result of water being preheated by the regenerative heat exchanger 24 and is at a somewhat higher pressure than the combustion gas to promote proper mixing.

3. The resultant mixture of combustion products of air and steam, hereafter called the gas mixture, is at a specified maximum tubine inlet temperature and specific heat input rate (SHIR) whose units are Btu/lb of air/sec., which dictate the combination of water-air ratio (XMIX). (Note that XMIX denotes generally the ratio of the liquid-vapor to gaseous working fluids which in this case are water and air, respectively.) SHIR can be used to determine the air-fuel ratio (AFR) by th fuel types. Expansion of this gas mixture takes place in turbines 26 and 28. The first or high temperature or core turbine 26 drives the air compressor through a connecting shaft. The second or power turbine is a free turbine 28 which provides the useful output work.

4. The gas mixture discharging from the power turbine is then passed through a counter flow regenerative heat exchanger 24. This heat exchanger in most cases uses the otherwise rejected heat from the cycle to preheat the water to steam at superheat temperatures which is then injected into the combustor 16. Thus, the heat in the cycle is "regenerated." For start-up and some special applications, after burning can also be provided in the exhaust gas between the turbine exit and the heat exchanger. The gas mixture on the hot side drops from the turbine discharge temperature to an exhaust temperature with the saturation temperature of the steam in the gas mixture as a lower limit. The steam is raised to superheated temperatures, and depending upon the specified cycle pressures and temperature, is at or near the maximum superheat temperature point.

Two thermodynamic limits are placed on the heat exchanger: first, the maximum temperature of the water after waste heat recovery cannot exceed the gas mixture temperature at the power turbine discharge. Second, the gas mixture temperature at the location in the heat exchanger where the water boils (saturation temperature) cannot be less than this water saturation temperature. This is called the heat exchanger "neck" and will be discussed further subsequently.

5. The gas mixture leaves the heat exchanger 24 at or above the saturation temperature of the steam in the gas mixture as determined by the partial pressure of the steam, and it then passes through condenser 30. In general, no condensation is desirable in the heat exchanger 24. Rather, steam condenses to water and is separated from the mixture in the condenser 30. The remaining products of the combustion of air are exhausted to the atmosphere. The condensed water is purified, pumped to high pressure and recycled to the regenerative heat exchanger.

To better illustrate this dual-fluid, parallel-compound regenerative principle, reference is made to the thermodynamic heat cycle of FIG. 2*a* illustrating for each of the two working fluids the temperature-entropy (T-S) diagram, which, as will be shown, are coupled in parallel during certain parts of the cycles. This chart is idealized in that minor efficiency losses are not considered. In addition the two fluids are treated separately in their Brayton and Rankine cycles respectively for illustrative purposes. Although the two working fluids shown in FIG. 2*a* have their own separate cycle T-S diagrams, they are very much interdependent.

The gaseous working fluid starts at state 1 and is compressed to reach 2. Combustion and steam mixing takes place to enable the thermodynamic state to reach 3. Expansion together with steam brings the thermodynamic state to 4. Exhaust heat is transferred to the other working fluid and some cooling thus, theoretically, returning the thermodynamic state back to 1.

The liquid at 5 is pumped to a pressure slightly higher than 2, with essentially little change of temperature and entropy. The high pressure liquid receiving heat energy from the turbine exhaust mixture is heated to boiling temperature $T_6$. A limitation exists that at any time $T_6$ has to be lower than $T_6{}^{*\prime}$. This will be explained in a later section. Since $T_6$ is a function of pressure, the pressure and temperature relationship of the two working fluids begins to become explicit. The liquid is continuously heated either before saturation at 7 in order to allow more Rankine working fluid in the cycle or to be heated to superheat temperature $T_7'$ just below $T_4$. The steam is mixed with the combustion products of air and fuel to reach $T_8$. The steam temperature $T_8$ is equal to $T_3$ of the gaseous working fluid. The expansion from 8 to 9 takes place with the gaseous working fluid, where $T_9$ equals $T_4$.

The foregoing would not be possible if the steam and the gaseous working fluid would expand separately due to their difference in specific heat ratio ($k = Cp/Cv$; specific heat at constant pressure/specific heat at constant volume). If the gaseous working fluid is air, $Cp_{air}$ is approximately half that of the steam, but $k_{air}$ is usually larger than $k_{steam}$, hence air helps the steam to convert more heat energy to mechanical work with a sacrifice of work accomplished by the air itself. Hence, the fact that the two working fluids are mixed together becomes critical.

The exhaust heat in the steam is also transferred to the incoming liquid-vapor, along the path of 9→10, thus making it a unique regenerative steam cycle. The steam is condensed out of the mixture to return to the thermodynamic state 5. As described above, the two fluids are actually physically mixed during the expansion and heat exchange processes. It is also important to recognize that waste heat from both the Brayton cycle (area a) and the Rankine cycle (area c) is used in the regeneration process to preheat the incoming water to steam only in the Rankine cycle (area b) before it is mixed with the combustion products of air.

From FIG. 2*a*, it is obvious that the ratio of the two working fluids are not expressed by the T-S diagram. The temperature in the T-S diagram is known as the sensible temperature. This means that the temperature can be measured by a thermometer. With this new cycle, an effective temperature is defined as:

$$T_{eff} = \frac{C_{P_{gas}} T_s + XMIX[h_1(T_{s_1}) + h_{fg}(T_{s_1}P_s) + h_v(T_sP_s)]}{C_{P_{gas}}(1 + XMIX)}$$

XMIX — Rankine fluid/Brayton fluid
$T_s$ — Sensible temperature
$T_{sl}$ — Liquid boiling temperature — at partial pressure
$C_p$ — Specific heat at constant pressure
$h_l$ — Liquid phase enthalpy; Btu/lb
$h_{fg}$ — Latent heat of evaporation; Btu/lb
$h_v$ — Superheat enthalpy; Btu/lb
$p_s$ — partial pressure of the vapor In large part, $T_{effective}$ governs the engine cycle efficiency. If there is no Rankine working fluid, $T_{eff}$ equals $T_s$. Then the cycle becomes essentially a simple Brayton cycle. At a fixed compression ratio the exhaust temperature measured in terms of $T_s$ is high, so the heat rejection rate is high. When Rankine fluid is introduced into the cycle, the effectiveness of heat recovery makes the exhaust temperature measured in terms of sensible temperature low. This can be seen in FIG. 2*b*. If the upper sensible temperature (turbine inlet temperature, $T_3$ and $T_8$) is fixed, then the more Rankine fluid (XMIX) that is introduced, the higher will be the upper effective temperature and at the same time, the lower sensible temperature after heat recovery is decreased. But the effective temperature at the lower side (exhaust side) reaches a minimum ($T_{eff_{min}}$) at a certain XMIX depends on turbine inlet sensible temperature and cycle pressure ratio.

The effective temperature beyond $T_{eff_{min}}$ is higher due to the large amount of latent heat of evaporation being carried away by the Rankine working fluid. Therefore, at that $T_{eff_{min}}$, the Rankine working fluid to Brayton working fluid ratio ($XMIX_{peak}$) is uniquely defined. Any other mixture ratio means that more heat than necessary is rejected, resulting in a lower cycle efficiency. ($XMIX_{peak}$) is influenced by the cycle upper sensible temperature and compression ratio. Without the recognition of the significance of $T_{eff}$, the steam injection rate (and steam property) and the conditions on the heat exchanger could only be arbitrary at best. In other words, the high efficiency potential of this heat engine over the combined cycle results only with the recognition of the foregoing. The uniqueness of $XMIX_{peak}$ is an important element in defining this new thermodynamic cycle, with all the engine operating parameters related to each other.

FIG. 3 is a diagram which shows the relative temperature levels on both sides of the heat exchanger 24. The following list identifies the subscripts of the various temperature notations used there:

MIXTURE TEMPERATURES $T_{MIN}$ — Turbine Discharge Temperature
$T_{MNECK}$ — Neck Temperature
$T_{MOUT}$ — Heat Exchanger Exit (Minimum value = $T_{MSAT}$)
$T_{MSAT}$ — Saturation Temperature of Steam in the mixture

WATER/STEAM TEMPERATURES $T_{LIN}$ — Water Inlet Temperature
$T_{LSAT}$ — Saturation (Boiling) Temperature
$T_{LOUT}$ — Steam Discharge Temperature All the temperatures referred to above are sensible temperatures.

TEMPERATURE CONSTRAINTS $\Delta T_{NECK}$ — Minimum Temperature Differential at Neck
$\Delta T_{HOT}$ — Minimum Temperature Differential at Hot End This sketch points up two basic thermodynamic limitations in the heat exchanger: first, the temperature of the super-heated steam on the water side cannot exceed the temperature of the gas mixture at the power turbine discharge. Second, at the point in the heat exchanger 24 where the water has reached boiling temperature, the gas mixture temperature cannot be less than the water boiling temperature. This is called the "neck" of the heat exchanger. The neck can be reduced by after burning to increase thoughput with some sacrifice of efficiency.

The two basic independent parameters that specify the cycle operating point are the turbine inlet temperature (TIT) and the compressor pressure ratio (CPR) — also called the cycle pressure ratio. In fact, once TIT is established, a range of CPR's is permitted, and selection is made based on economic consideration primarily. The remaining two parameters that must be specified are the allowed specific heat input rate (SHIR) Btu/lb of air/sec) or air-fuel ratio and the steam-air ratio. These two parameters are directly coupled to each other and to both CPR and TIT; they cannot be specified independently. Only the engine components selected according to a critical choice of these parameters can produce the best efficiency.

In the conventional Brayton cycle using a single working fluid, the specific heat input rate, SHIR, (air-fuel ratio in the case of heating by combustion) is uniquely defined once CPR and TIT are specified. However, in the dual fluid cycle with a given TIT, the addition of steam in the combustor requires an increased SHIR (reduced air-fuel ratio) as the water rate is increased. The increased heat input per pound of air at the lower air-fuel ratio is offset by the increased heat necessary to achieve super-heated steam at the specified TIT. Thus, there is a wide range of combinations of SHIR and water-air ratio (XMIX) that can be specified for a given CPR and TIT. These are the four key cycle parameters used to describe the dual fluid cycle.

The selection of the design operating point for the cycle from the wide range of possible combinations of these four parameters is based on requirements for high thermal efficiency and/or high power throughput. Thermal efficiency is a direct measure of the powerplant fuel consumption for a given output of power, and thus has a major effect on the operating costs of the powerplant. Throughput is the power output measured against the size of the powerplant. This size is most often related to the airflow pumped through the compressor. Thus, throughput can be measured as power per unit airflow. The initial cost of the powerplant is roughly inversely proportional to its throughput.

An engine cycle cannot be designed to achieve both maximum efficiency and maximum throughput, a fact which is common to virtually all heat engine cycles. For this reason, a narrow region of cycle design parameters is described and claimed for this invention which encompasses cycles having maximum efficiency and those which are a compromise between high efficiency and high throughput. However, the maximum throughput design point can be chosen without too much sacrifice of the efficiency. Preferably, turbine inlet temperature can be maximized by steam film cooling or other methods so that throughput and efficiency can both be increased.

Ordinarily, the two independent parameters in any cycle design are turbine inlet temperature (TIT) and compressor pressure ratio (CPR). In the heat engine of the present invention, the remaining parameters of interest are the specific heat input rate (SHIR), the ability of the system to absorb heat and the steam-air ratio (XMIX). Many combinations of these two parameters are theoretically possible, but they cannot be specified independently once TIT has been set and once the specified condition for maximum efficiency or high throughput is determined. Small deviations from the examples given later are allowed due to compressor and turbine adiabatic efficiencies and also due to the specific design limitations of the heat exchanger. The specific limits and the reasons for the limits are now discussed.

Performance curves of a Cheng cycle engine are calculated based on present day realistic engine components. The compressor efficiency is assumed to be 0.84, the turbine efficiency is 0.90, the combustion efficiency is 0.99, and the pressure drop in the combustion chamber is 4%. The steam temperature is only allowed to reach a level not over 50° F. below the exhaust temperature of the turbine. This assumption is made for practical engineering reasons rather than the thermodynamic limit. The limitation of the low temperature end at the exit of the heat exchanger is made so that the gas-steam mixture does not reach the dew point of the mixture to avoid corrosion in the heat exchanger. This again is a practical reason. As component efficiency improves in the future, the peak efficiency point will shift towards higher steam to air ratio as will be seen.

It should also be realized that with equipment having different efficiencies the performance curves which follow will vary somewhat. But, with the invention of this new cycle, peak efficiency always occurs at minimum $T_{eff}$ and $XMIX_{peak}$. Hence it is not intended that the following performance curves be interpreted as exact or ironclad. Variations will exist depending upon the hardware used.

Figure 4:
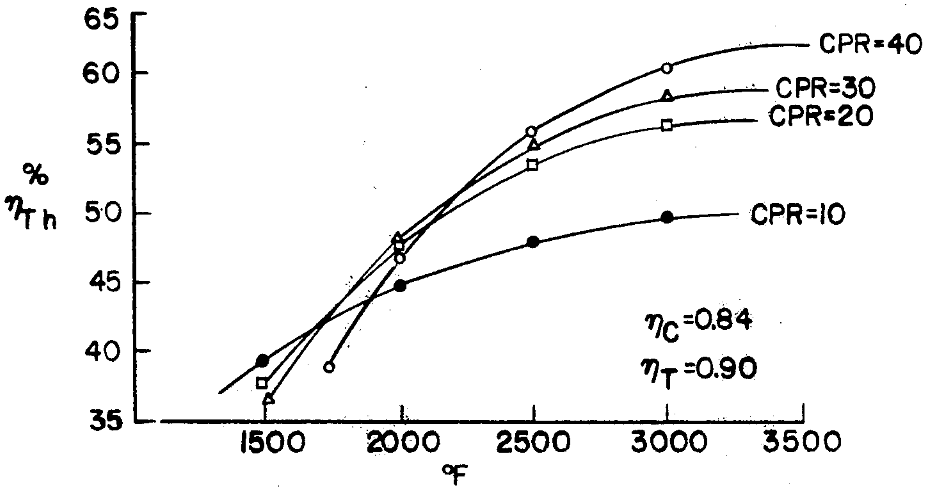
FIG. 4 illustrates the engine cycle efficiency of a dual-fluid heat engine plotted as a function of the turbine inlet temperatures at constant compression ratios for peak efficiency operation.
Figure 5:
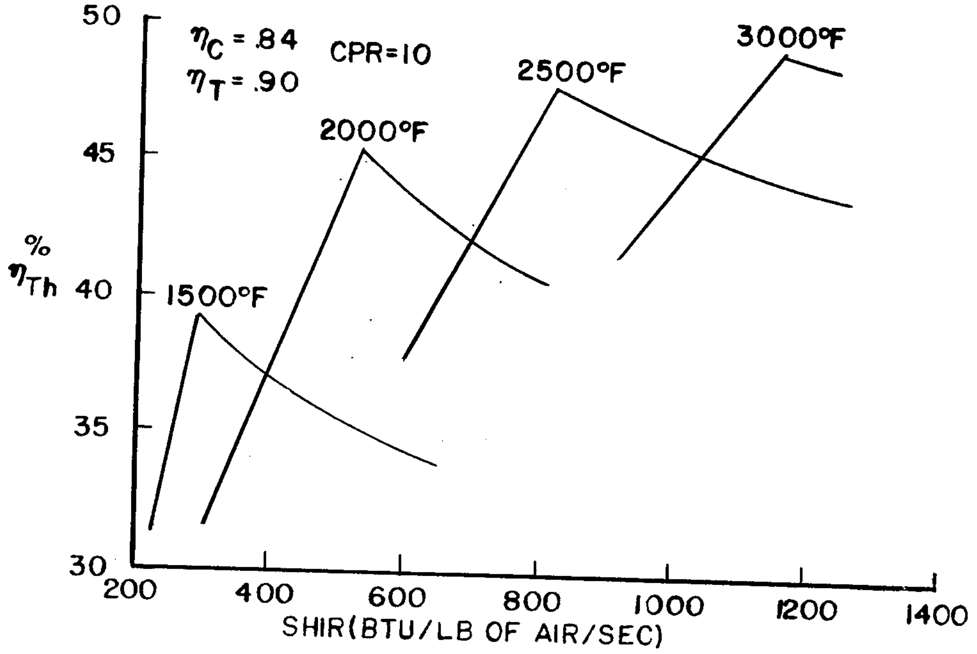
FIGS. 5 – 8 illustrate graphically the efficiency of a dual-fluid engine plotted against the specific heat input rate for 1500° F. – 3000° F. at constant compression ratios of 10, 20, 30, and 40, respectively.
Figure 6:
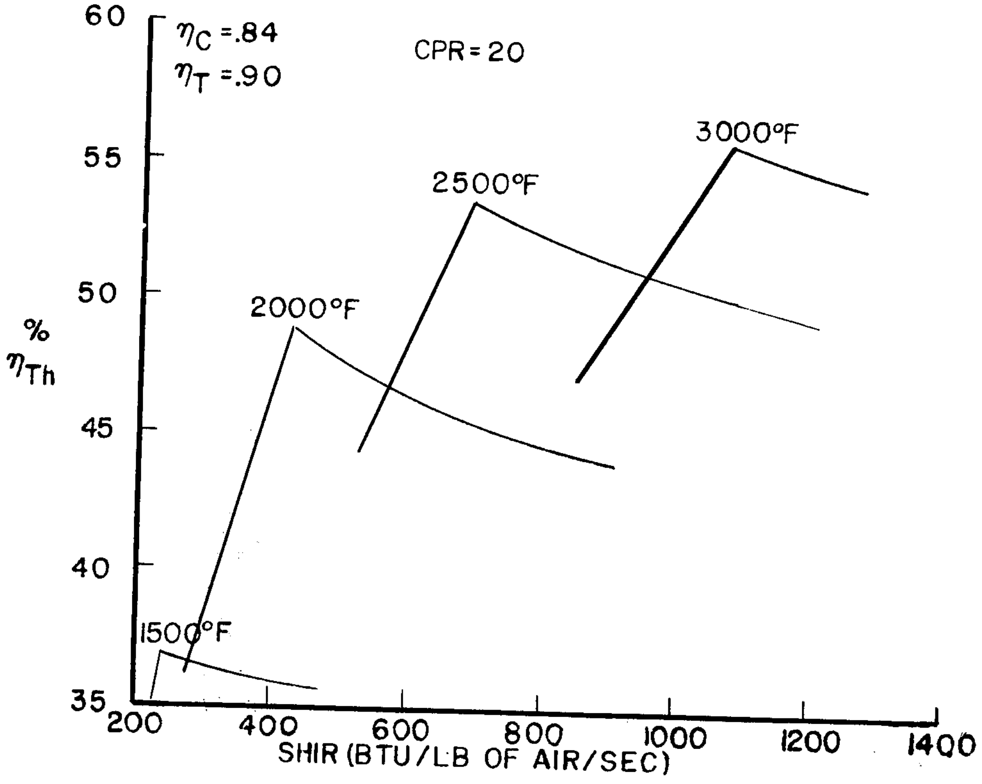

In FIG. 4, the cycle efficiency is plotted as a function of TIT at constant CPR's for peak XMIX and efficiency. It is obvious that the overlapping of the constant CPR curves defines the operating relationship between TIT and CPR. Even with the peak XMIX found, one can still see that a high CPR is needed to achieve high cycle efficiencies, but their relationships are confined to a very narrow band, in the useful regions. For example, at a TIT of 1500° F., no higher than CPR = 10 should be used. At TIT of 2000° F., CPR = 20 or better is preferred. If CPR is lower than 10, this would make the engine suffer an unnecessary loss of efficiency, unless reasons other than high efficiency (such as the requirement of lighter weight for vehicular or aircraft uses) would be desirable. As will be shown later in connection with FIG. 9, a compression ratio of less than about one-third of the compression ratio to achieve peak efficiency results in a substantial loss of efficiency, beyond that for acceptable engine operation.

In FIGS. 5-8, engine efficiency is plotted against SHIR for 1500° F.-3000° F. and at constant CPR's of 10, 20, 30 and 40, respectively. It is quite evident that the efficiency peaks at certain SHIR for a given TIT and CPR due to a minimum $T_{eff}$ at this point. The interdependency of TIT and CPR is summarized in FIG. 9. Note how the thermal efficiency peaks for a given TIT with CPR. The CPR and TIT optimization can be understood from the trade-offs between higher degrees of superheat at the exit of the heat exchanger 24 and more steam. High CPR increases the boiling temperature which tends to lower the turbine exhaust temperature, thus lowering the degree of superheat at the exit of heat exchanger 24. Too low a CPR increases the degree of superheat but lowers the water-to-air ratio, XMIX at peak. This can be clearly seen in FIGS. 10-13 which is a plot of SHIR vs. the degree of superheat of the regenerated steam for constant values of CPR.

Figure 10:
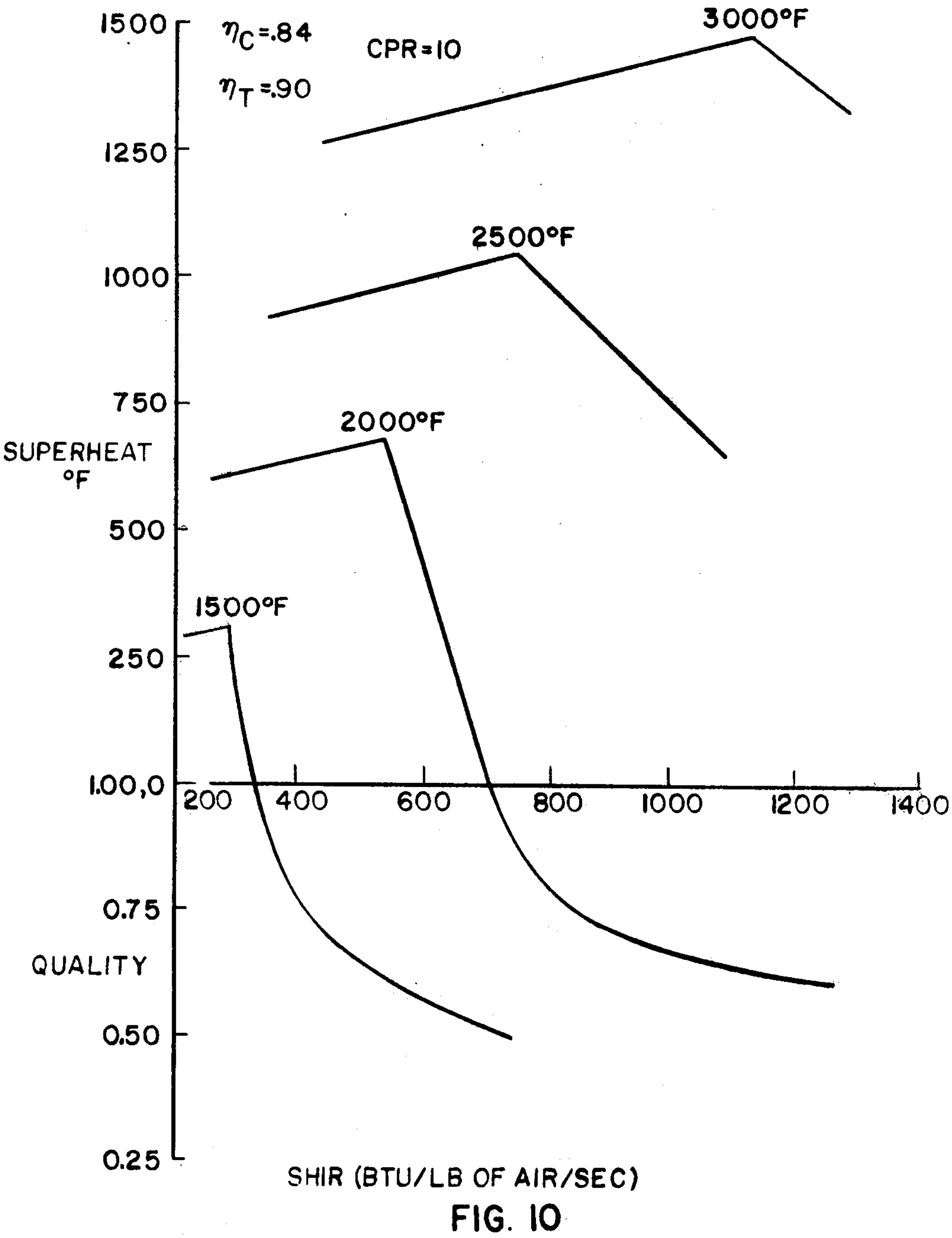
FIGS. 10 – 13 graphically plot the specific heat input rate versus the degree of superheat at different values of turbine inlet temperatures of the regenerated steam for compression ratio values of 10, 20, 30, and 40, respectively in a dual-fluid heat engine.
Figure 11:
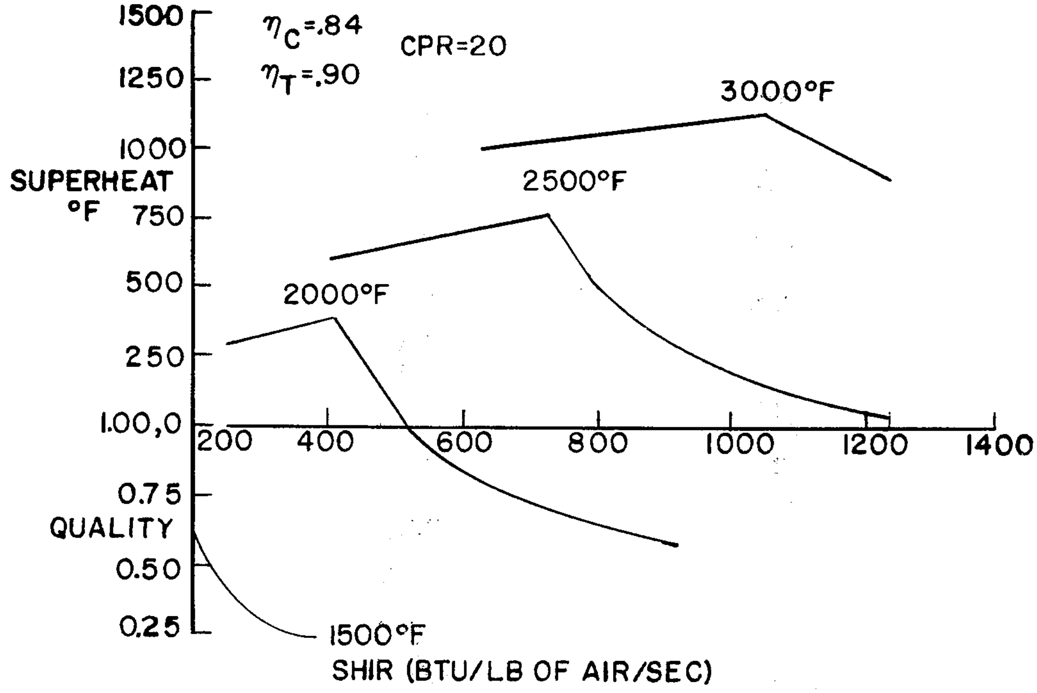

From FIG. 10, at TIT = 1500° F., CPR = 10, the degree of superheat of the regenerated steam at the peak is approximately 300° F. In the meantime, at TIT = 2000° F., CPR = 10, the degree of superheat is approximately 650° F. When compared with data in FIG. 11, at TIT = 2000° F., CPR = 20, the degree of superheat at this peak is 340° F. and the efficiency and throughput are both improved over the CPR = 10 case. When CPR = 40, TIT = 2000° F., in FIG. 13, the degree of superheat at the peak is 120° F. The efficiency again becomes less than that for the CPR = 20 case as shown in FIG. 11. Thus the choice of the degree of superheat is critical to cycle efficiency.

Figure 9:
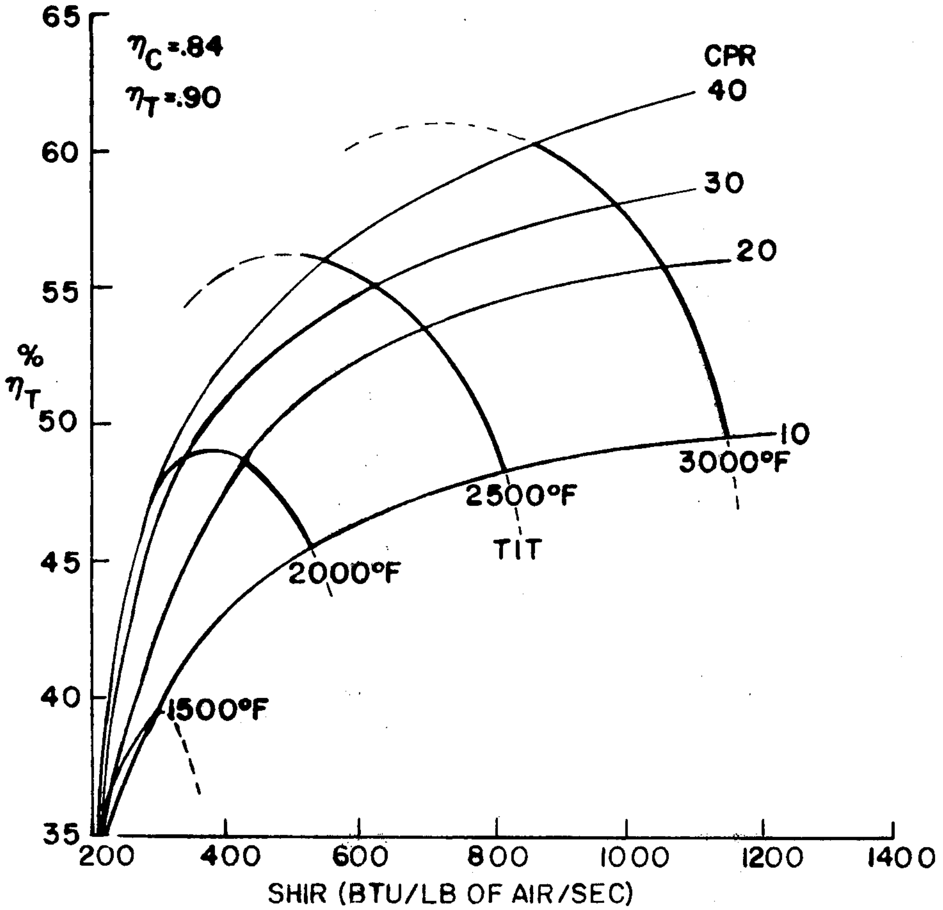
FIG. 9 is a graphical illustration depicting the interdependency of the turbine inlet temperature and the compression ratio in a Cheng cycle heat engine.

The parameters of CPR and TIT are related uniquely as exhibited in FIG. 9. Of particular interest is the fact that the peak efficiencies shown in FIGS. 5-8 occur when the regenerated steam is at the maximum degree of superheat, for a given CPR. CPR is related to the maximum possible degree of superheat at the peak such that the degree of superheat at the peak is in the range of 250° F. to 650° F. Choice of CPR resulting in degree of superheat at the peak, higher than 650° F. or lower than 250° F. results in poorer cycle efficiency. Note that efficiency drops off from a peak efficiency at a given TIT as CPR drops off in value. As an approximate boundary for reasonably efficient engine operation, CPR should not go below one-third of the value of CPR at peak efficiency for a given TIT.

For maximum throughput consideration, the quality (percent of vapor in the wet steam) of steam levels off very sharply with SHIR as shown in FIGS. 10, 11, 12 and 13. This means that at high specific heat input rates and leveling steam quality, the cycle essentially approaches a regenerative Rankine cycle engine. At low SHIR and high superheat, the amount of steam that can be injected becomes so small, the cycle approaches a regenerative gas turbine. Only in the neighborhood of the peak degree of superheat is the interaction of the two cycles mutually beneficial to each other. This is another example of the uniqueness of the Rankine to Brayton cycle working fluid ratio of the present invention.

For throughput consideration, one can always tolerate higher SHIR but only to the point where variation of steam quality versus SHIR becomes small. As a practical matter, once SHIR exceeds approximately twice the value of SHIR at peak efficiency, engine efficiency is too low for normal engine applications. This is evident from FIGS. 10-13, as the superheated steam drops rapidly as SHIR is increased.

Figure 14:
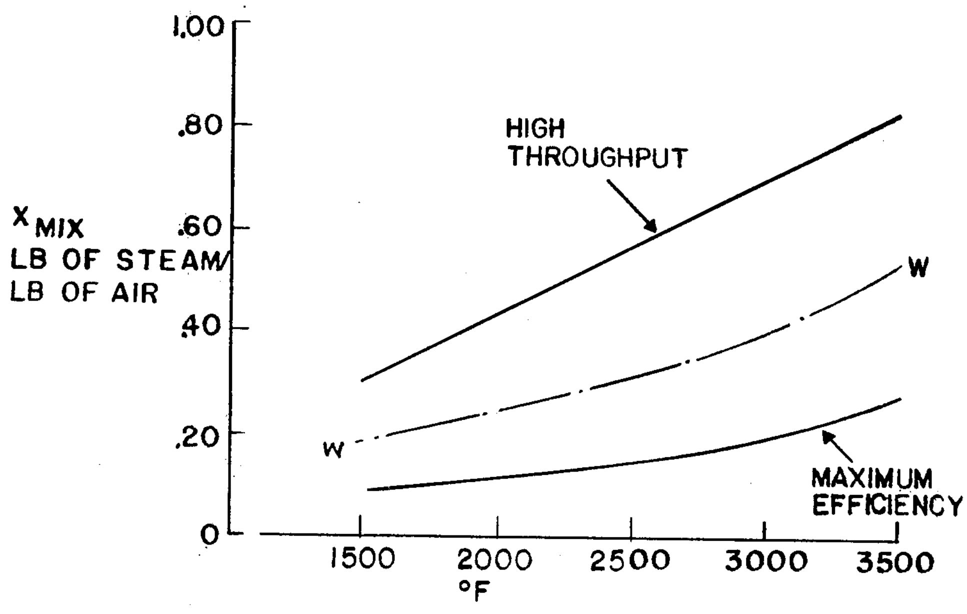
FIG. 14 defines the range of XMIX for a dual-fluid heat engine for operation from maximum efficiency to high throughput.
Figure 15:
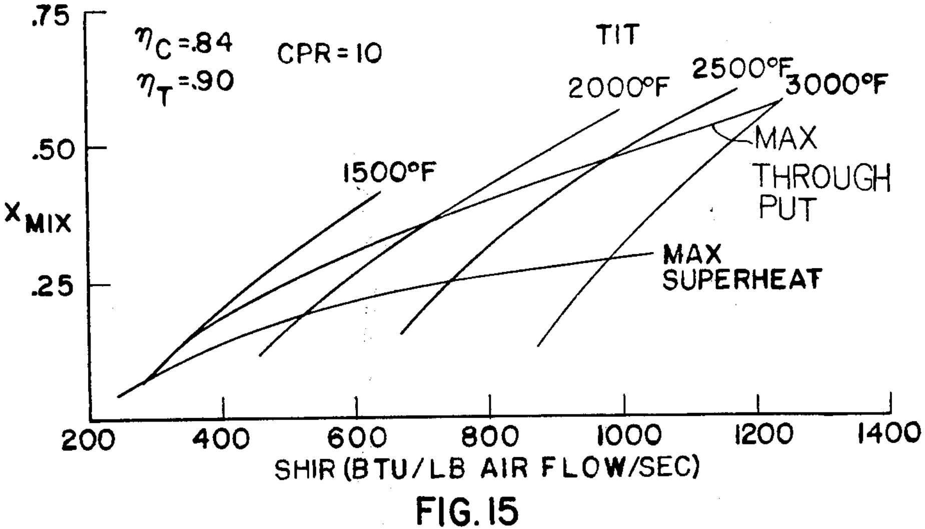
FIGS. 15 – 18 illustrate the dependence of XMIX as a function of the turbine inlet temperature, the compression ratio, and specific heat input rate; for compression ratios of 10, 20, 30, and 40, respectively.
Figure 16:
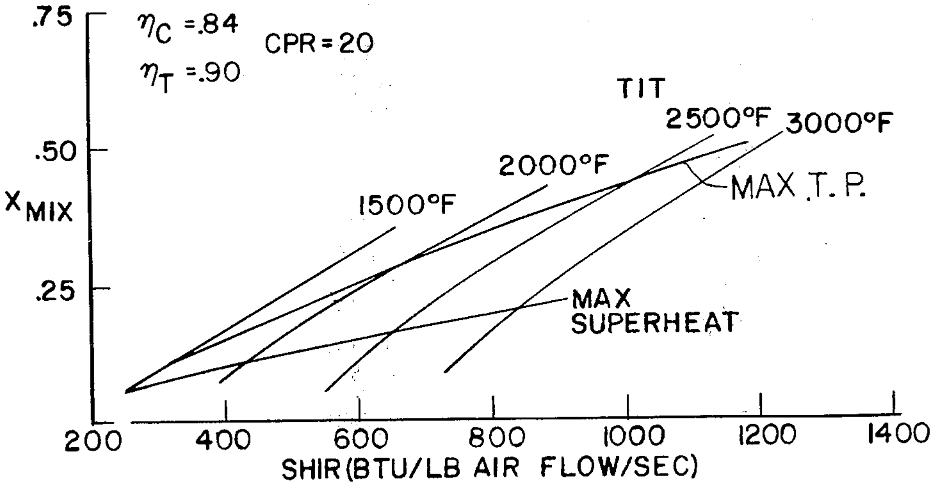
Figure 17:
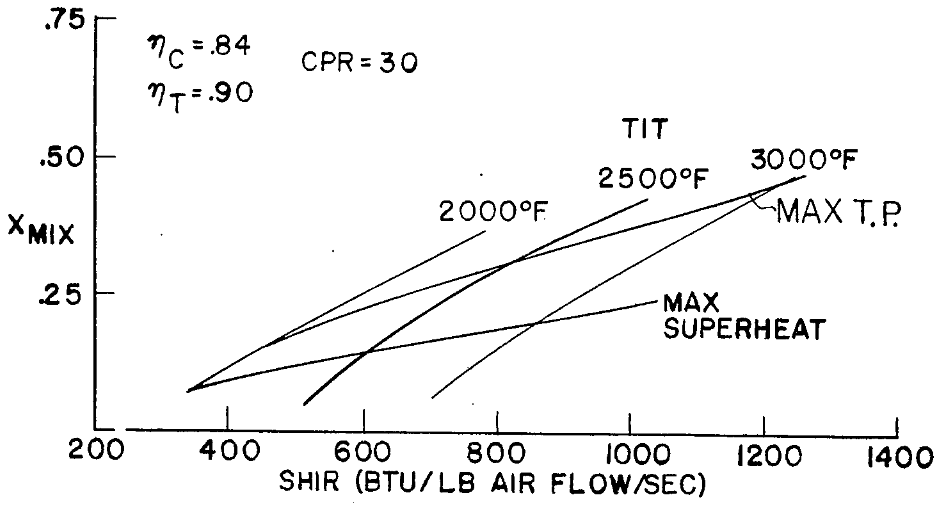
Figure 18:
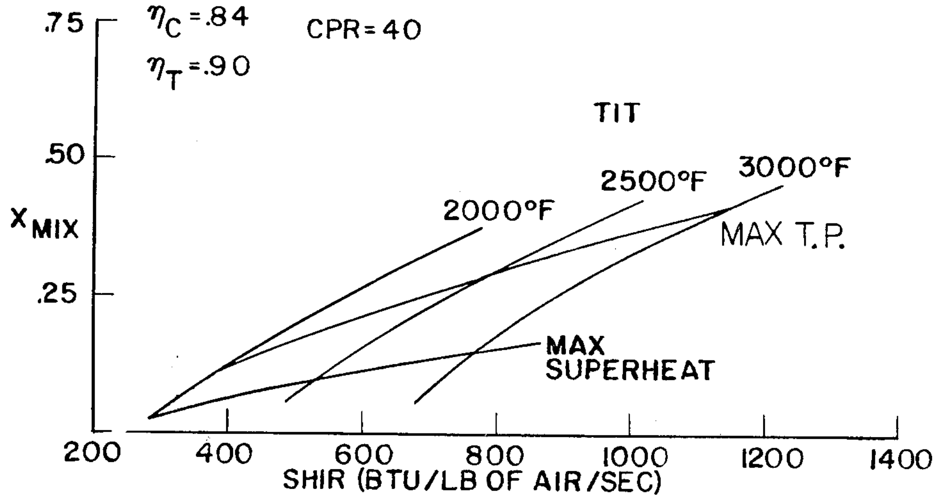

With the combination of the results of FIGS. 10-13, the XMIX for the engine is bound within a very narrow region as shown in FIG. 14. This region can be described by the equation along W—W:

$$XMIX = 0.0623 + 0.1217(TIT/1500^\circ F.)^{1.65} \text{ from } TIT = 1500^\circ F. \text{ to } 3500^\circ F.$$

with a ±50% width.

Figure 19:
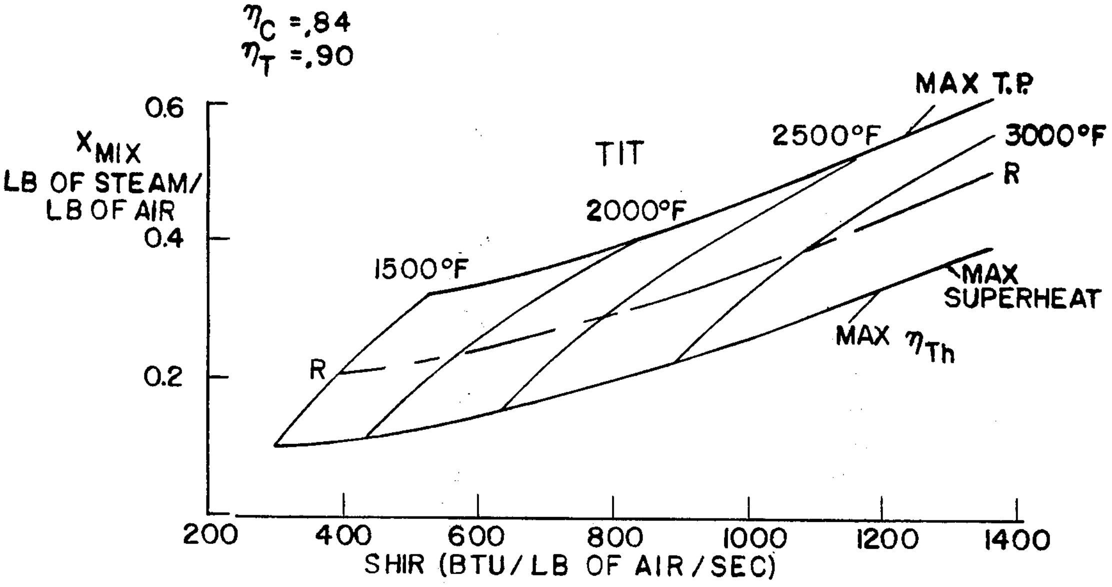
FIG. 19 is a graphical illustration showing the useful XMIX region as a function of specific heat input rate for the design and operation of a dual-fluid heat engine for maximum efficiency to maximum throughput.

The dependence of XMIX as a function of TIT, CPR and SHIR can be seen in FIGS. 15, 16, 17 and 18. The lower boundary is the limit of the highest degree of superheat using a conventional heat exchanger and 50° F. below the exhaust mixture temperature. However, due to the linking of TIT and CPR (FIG. 9), the useful XMIX region as a function of SHIR is shown in FIG. 19. Note that the lower boundary is taken as approximately the highest degree of superheat with the best CPR for a given TIT.

FIGS. 20, 21, 22 and 23 describe the behavior of the Cheng cycle engine parameters on throughput (Hp/lb of air/sec), which is inversely proportional to the engine size. Of particular interest is the crossover of the throughputs. This indicates that one cannot arbitrarily increase SHIR or XMIX to gain throughput at a given TIT, rather it is better to increase TIT when SHIR or XMIX is increased, so that both efficiency and throughput are improved. From the crossover behavior of the throughput, the upper bound of XMIX for maximum throughput can be approximately defined as the maximum throughput line from FIGS. 14 to 19.

Figure 24:
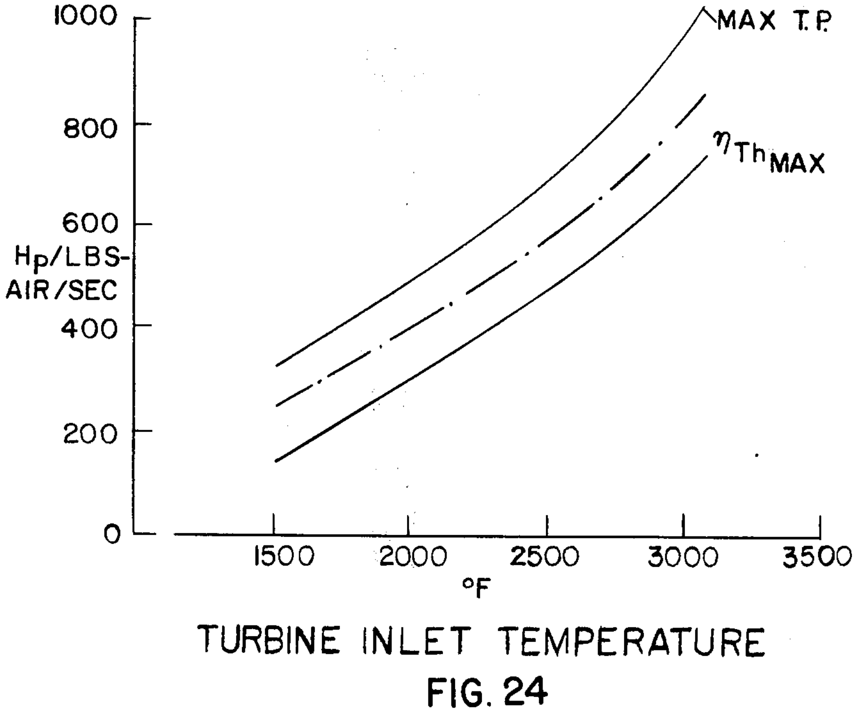
FIG. 24 is a graph illustrating the narrow range of throughput operating regions as a function of the turbine inlet temperature for a dual-fluid engine designed for operation between maximum efficiency and maximum throughput.
Figure 20:
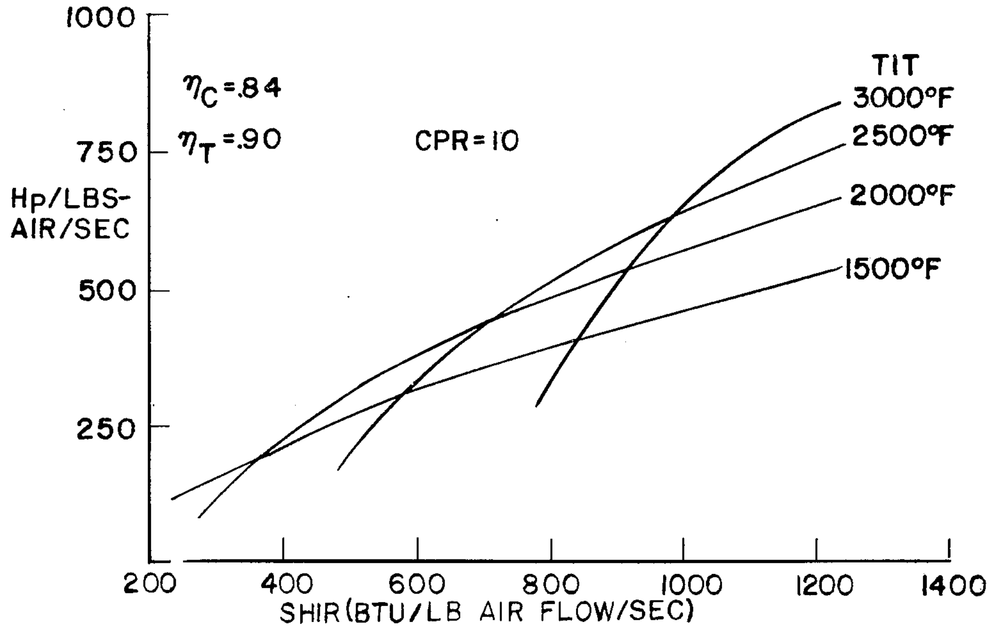
FIGS. 20 – 23 graphically illuustrate engine throughput as a function of the specific heat input rate for compression ratios of 10, 20, 30, and 40, respectively.
Figure 21:
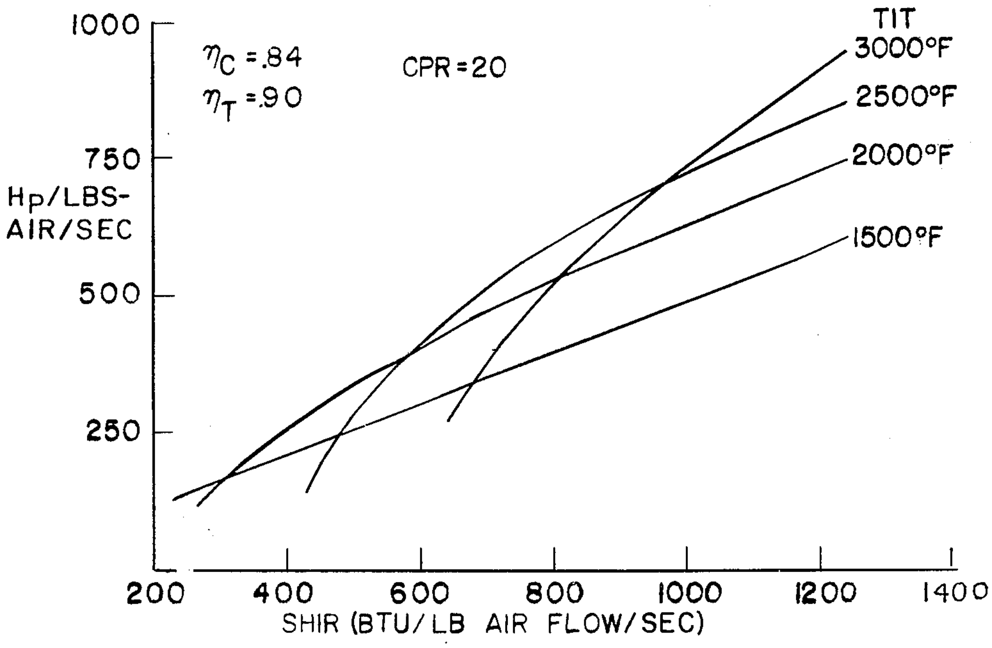
Figure 22:
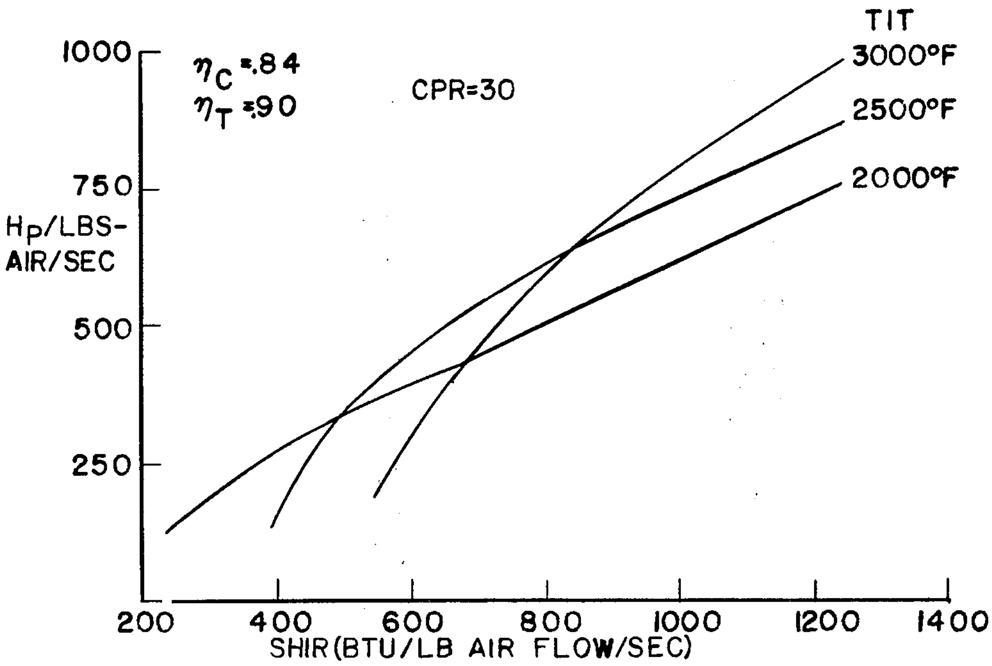
Figure 23:
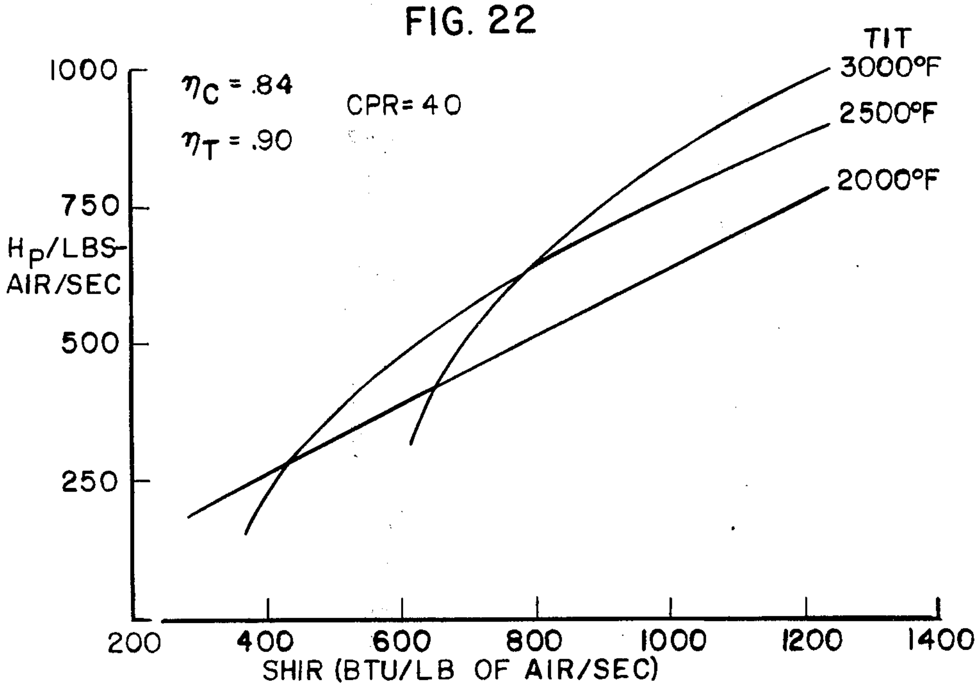

To summarize, all the throughput operating regions fall into a very narrow range as shown in FIG. 24. The interconnection of all the engine operating parameters have been described. For a given TIT, only a best CPR can produce the peak engine efficiency with a conventional heat exchanger. At that peak efficiency, the heat input rate and Rankine/Brayton working fluid ratio is unique. Variations are possible only because of different component efficiencies used to construct the engine. Increasing XMIX from $(XMIX)_{peak}$ can improve throughput with a sacrifice of efficiency, but even that is limited from the crossover properties on TIT. Therefore, for a given TIT, XMIX is bounded from XMIX at peak efficiency to a larger but finite value for maximum throughput. Over that value, the engine cannot gain either throughput or efficiency. It is best to increase TIT from thereon. XMIX lower than the XMIX at the peak also loses both efficiency and throughput.

Correlation of a typical XMIX and a typical SHIR as a function of TIT with the best CPR operating variations with component efficiency chosen above can be shown in FIG. 19. The preferred operating region can also be represented by an equation along R—R with a width of ±0.1 for XMIX:

$$(XMIX) = 0.178 + 0.0268\ (SHIR/400 Btu/lb\ air)^{2.05}$$

The R—R XMIX = $(XMIX)_{R-R} - 0.1$ boundary represents the best efficiency line or $XMIX_{peak}$ line. The XMIX = $XMIX_{R-R} + 0.1$ line represents approximately the largest value for XMIX at a given TIT. That line is a recommended line for engine performance and cost tradeoffs. Hence, it is not as exact or definite as the maximum efficiency line.

From the operating regions shown above of the Cheng cycle engine, it is obvious that a higher TIT produces better engine performance. The choice of TIT depends only on the manufacture's economic considerations and turbine cooling methods.

It is understood that since steam is available, it can be used as a film cooling media for the turbine and nozzle rather than compressed bleed air. This further reduces the work required by the compressor and also it allows lower combustion chamber pressure drop. The steam used can be at a low temperature, thus reducing the coolant mass flow. This steam is counted as part of the working fluid.

Figure 25:
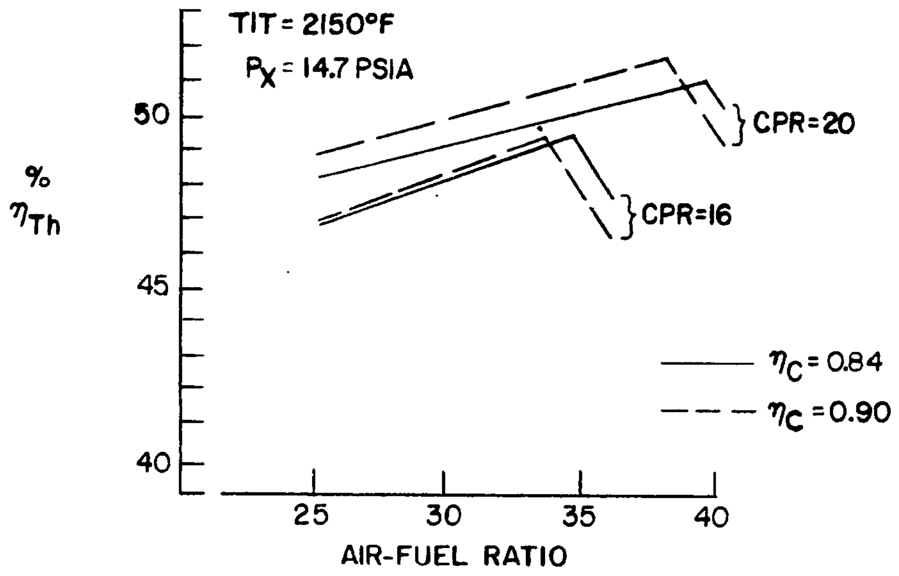
FIG. 25 illustrates the influence of compressor efficiency on overall engine efficiency for a dual-fluid cycle engine.

This cycle engine is not very sensitive to component's efficiency, as opposed, for example, to a gas turbine, where the compressor efficiency is the key to a good engine. The Cheng cycle engine traps and recirculates the waste heat generated due to the inherent inefficiency in the cycle. When compressor efficiency drops from 90% to 84%, for example, the overall thermal efficiency loss is only 0.25%. In a gas turbine such a drop in thermal efficiency could mean more than a 6% loss. The performance curves of two different efficiency compressors are compared in FIG. 25 for a hydrocarbon fuel.

Figure 26:
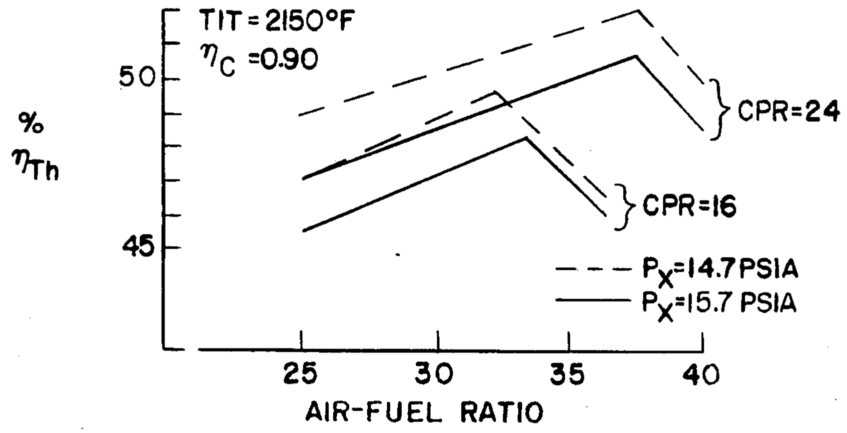
FIG. 26 illustrates the influence of the heat exchanger back pressure on the overall engine efficiency of a dual-fluid cycle heat engine.

Due to the ability to use a high compression ratio (CPR), back pressure at the exhaust does not cause as severe a loss as in the case of a conventional gas turbine. FIG. 26 depicts the fact that a 30 inch water (1 PSI) increase in exhaust duct back pressure for the Cheng cycle engine only causes about a 1% loss in thermal efficiency at the peak for CPR = 24, but a greater loss at lower CPR such as CPR = 16.

Sample data given in the following section provides typical engine performances using typical state-of-the-art component efficiencies and the design limits of a conventional counter-flow heat exchanger.

Figure 27B:
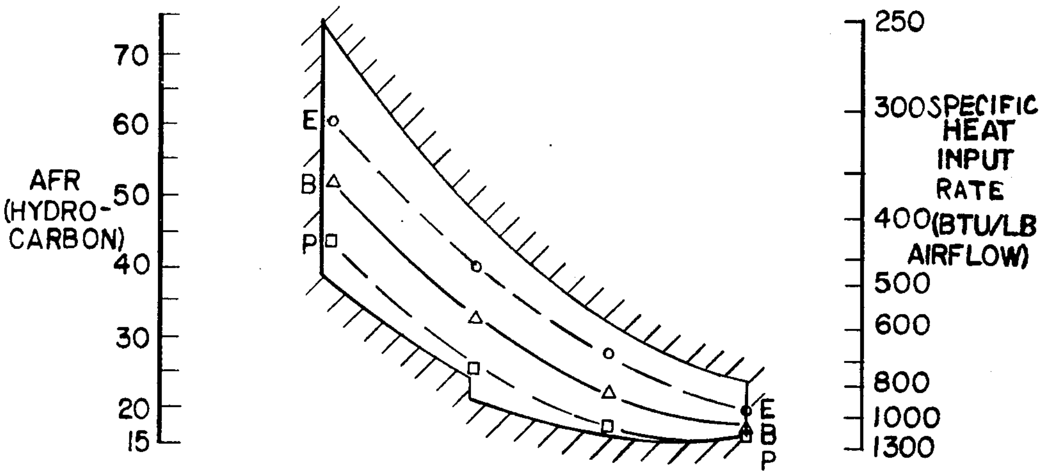
FIG. 27(*a*) graphically illustrates a range of compression ratios versus turbine inlet temperature for practical operation of a dual-fluid cycle engine.
Figure 27A:
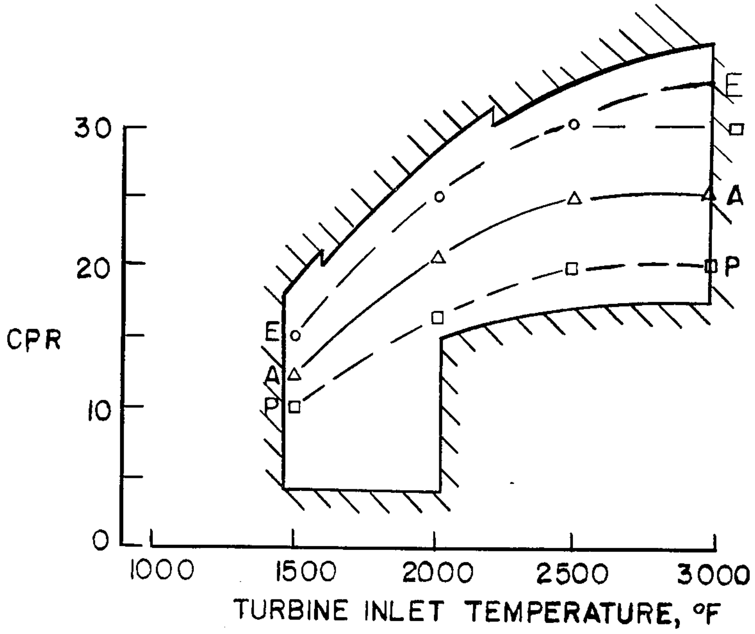

The data shown in FIGS. 27*a* and 27*b* is the result of numerous parametric combinations of TIT, CPR and SHIR (AFR) using a kerosene based fuel. TIT is selected as the independent parameter and regions are shown which cover a range of CPR and SHIR (or AFR). These regions constitute the combination of cycle parameters covered by this Cheng cycle heat engine with an ideal heat exchanger and a reasonable component efficiency, and they can be described mathematically in the range of TIT from 1500° F. to 3000° F. as follows:

The means value of CPR as a function of TIT is labeled as line A—A in FIG. 27*a* and is expressed as:

$(CPR)_{mean} \cong -21.25 + 21.14\ (TIT/1000) + 3(TIT/1000)^2 - 1.667(TIT/1000)^3$ for 1500° F. ≦ TIT ≦ 3000° F.

The upper bound of this region is:

$(CPR)_{upper_1} \cong (CPR)_{mean} \times 1.5$ for 1500° F. ≦ TIT ≦ 1600° F.

$(CPR)_{upper_2} \cong (CPR)_{mean} \times 1.4$ for 1600° F. ≦ TIT < 2200° F.

$(CPR)_{upper_3} \cong (CPR)_{mean} \times 1.3$ for 2200° F. ≦ TIT < 3000° F.

The lower bound of this region is:

$(CPR)_{lower_1} \cong 4.0$ for 1500° F. ≦ TIT < 2000° F.

$(CPR)_{lower_2} \cong (CPR)_{mean}/1.4$ for 2000° F. ≦ TIT < 3000° F.

The mean value of AFR based on kerosene type fuel as a function of TIT is labeled as line B—B in FIG. 24*b* *and is expressed as:*

$(AFR)_{mean} \cong 209.96 - 170.90\ (TIT/1000) + 52.93(TIT/1000)^2 - 5.81(TIT/1000)^3$ for 1500° F. ≦ TIT ≦ 3000° F.

The upper bound of this region is:

$(AFR)_{upper_1} \cong (AFR)_{mean} \times 1.4$ for 1500° F. ≦ TIT ≦ 3000° F.

The lower bound of this region is:

$(AFR)_{lower_1} \cong (AFR)_{mean}/1.4$ for 1500° F. ≦ TIT < 2000° F.

$(AFR)_{lower_2} \cong (AFR)_{mean}/1.5$ for 2000° F. ≦ TIT < 2500° F.

$(AFR)_{lower_3} \cong 15.0$ for 2500° F. ≦ TIT ≦ 3000° F.

For generality, this region can be converted to a specific heat input in terms of Btu/lb of airflow by the following equation:

Specific Heat Input (Btu/lb airflow) = 18600./AFR (kerosene based fuel)

if hydrocarbon liquid fuels are used. Otherwise the appropriate lower heat value should be used in place of 18600. A second scale is shown on FIG. 27*b* for the specific heat input in terms of Btu/lb of airflow for liquid hydrocarbon fuel.

The specific input rate is more precise than air/fuel ratio, not only because the lower heating value of fuels vary according to fuel types, but also the combustion products can change thermodynamic properties of the working fluid. SHIR, on the right hand scale of FIG. 27*b*, takes into account fuel flow rate in the cycle based on kerosene type fuel. An error is introduced from the above conversion formula that SHIR = 18600/AFR but it is approximately correct for other fuels. If gaseous fuels are used, the compression work on the fuel is neglected by assuming the fuels are pre-compressed by the supplier before delivery. A correction factor should be made if the gaseous fuel is not first compressed, but with the cycle described above, such a correction is obvious to one skilled in the art. With the above conditions in mind, the operating region in terms of SHIR can be described as follows:

The mean value of SHIR as a function of TIT is also labelled by B—B on FIG. 27*b* and is expressed as:

$$(SHIR)_{mean} \cong \frac{10^3 \text{Btu/lb of air}}{11.18 - 9.188\left(\frac{TIT}{1000}\right) + 2.846\left(\frac{TIT}{1000}\right)^2 - 0.312\left(\frac{TIT}{1000}\right)^3}$$

for 1500° F. ≦ TIT ≦ 3000° F.

The lower bound of SHIR in this region is $SHIR_{lower} \cong (SHIR)_{mean}/1.4$ for 1500° F. ≦ TIT ≦ 3000° F.

The upper bound of SHIR in this region is:

$SHIR_{upper_1} \cong 1.4 \times (SHIR)_{mean}$ for 1500° F. ≦ TIT ≦ 2000° F.

$SHIR_{upper_2} \cong 1.5 \times (SHIR)_{mean}$ for 2000° F. ≦ TIT ≦ 2500° F.

$SHIR_{upper_3} \geqq 1240$ Btu/lb for TIT ≧ 2500° F.

It is also a peculiar feature of the Cheng cycle that, at lower TIT, the advantage of the cycle disappears and is worse in terms of efficiency than the Rankine cycle below 1100° F. Thus, for the Cheng cycle, TIT higher than 1100° F. is more efficient.

FIGS. 27a and 27b identify the composite boundaries of SHIR (and AFR) and CPR, as a function of TIT for the dual fluid cycle heat engine of the present invention. Note that the lines labeled E—E are the loci of maximum efficiency, and those labeled P—P represent a compromise between high efficiency and high throughput. The regions beyond E—E and P—P included within the scope of the Cheng cycle engine are made to allow for higher efficiency components developed in the future and smaller temperature limits on future heat exchanger designs.

Figure 28:
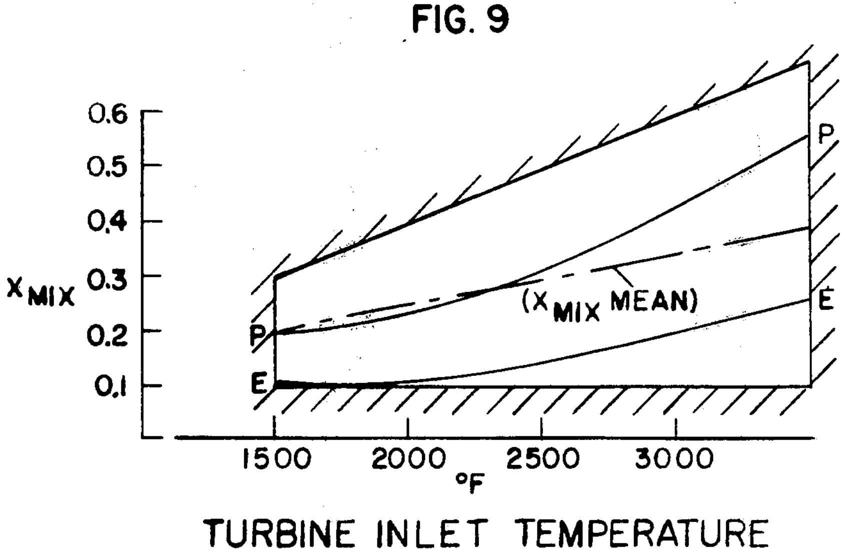
FIG. 28 illustrates a range for XMIX as a function of turbine inlet temperature which corresponds to the air-fuel ratio (and specific heat input ratios) and compression ratios illustrated in FIGS. 27(*a*) and 27(*b*)

The region shown in FIG. 28 shows the range of values of XMIX that will approximately result for the regions in FIG. 27. Again this region can be described mathematically.

The mean value of XMIX as a function of TIT in the middle of the operating region of FIG. 28 is expressed as:

$(XMIX)_{mean} \cong 0.20 + 0.0643(TIT/1500)$ for 1500° F. ≦ TIT ≦ 3500° F.

The upper bound for this region is:

$(XMIX)_{upper} \cong 0.3 + 0.0167(TIT/1500° F.)$

The lower bound of this region is:

$(XMIX)_{lower_1} \cong 0.1$ for 1500° F. < TIT < 3500° F.

Again, the line E—E which approximates maximum thermal efficiency for compressor efficiency of 0.84 and turbine efficiency of 0.90 is closer to the lower bound, and that which is the compromise between high efficiency and high throughput P—P is approximated by the upper bound. The upper and lower bounds shown in FIGS. 14 and 28 represent a consistent set of cycle parameter data for the Cheng cycle engine with reasonable component's efficiencies. The region beyond E—E and P—P which falls within the scope of the Cheng cycle engine of the present invention is anticipated for future improved engine component efficiencies.

Figure 29:
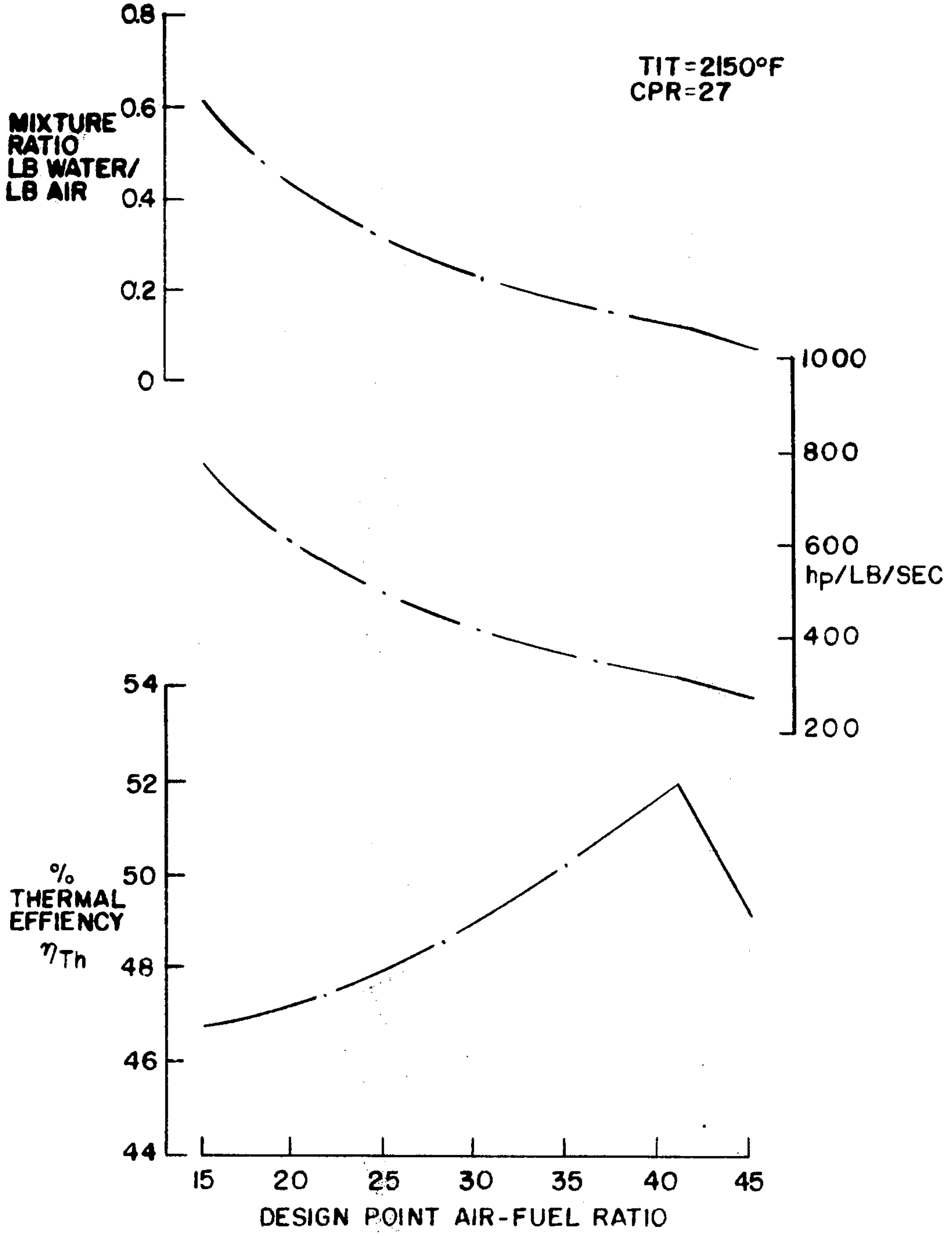
FIG. 29 illustrates the limitations of a conventional heat exchanger integrated into a regenerative parallel compound dual-fluid cycle heat engine by illustrating the engine thermal efficiency versus air-fuel ratio.
Figure 30:
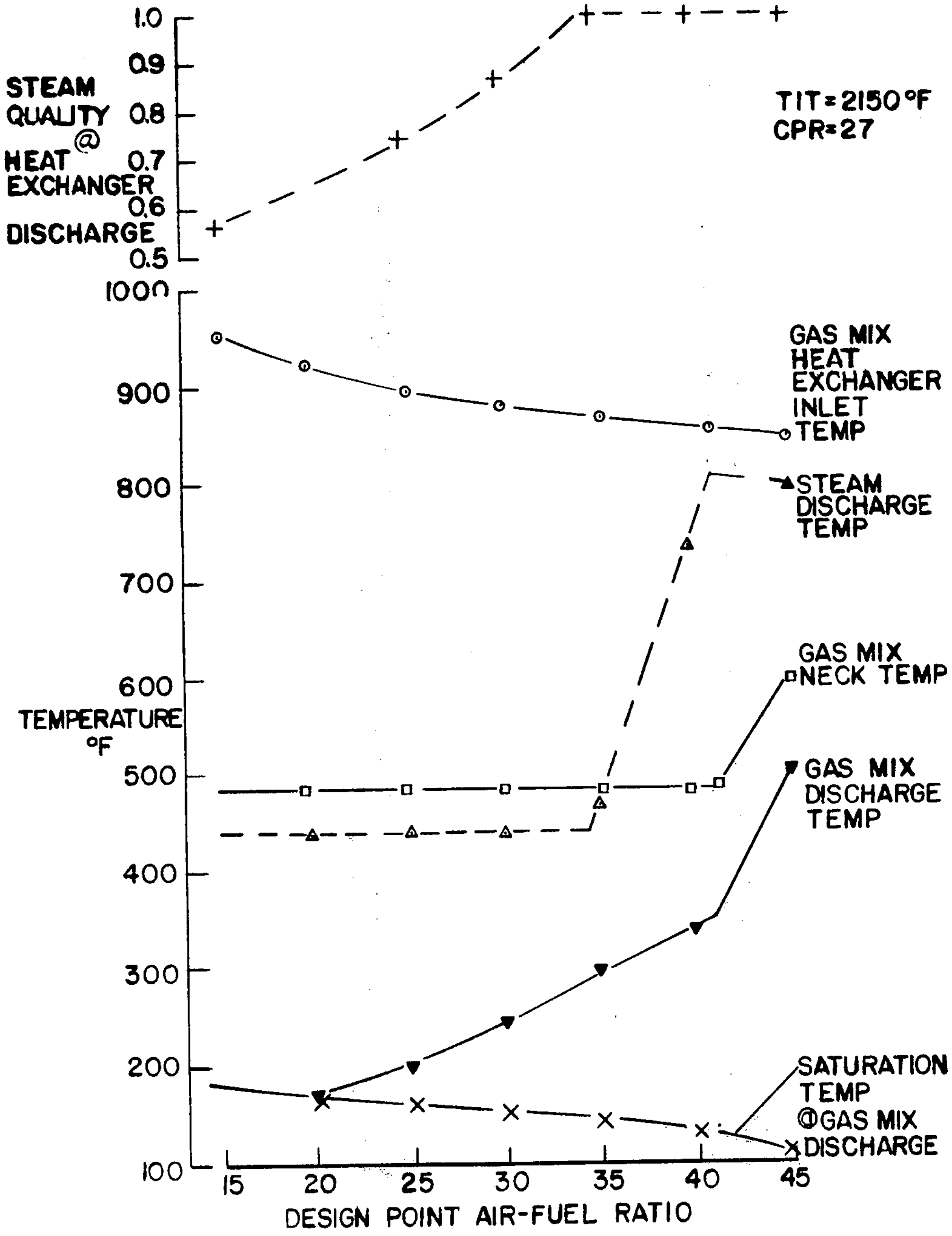
FIG. 30 illustrates graphically the effect of the temperatures on both sides of the heat exchanger of FIG. 1 as the air-fuel ratio is increased.
Figure 31:
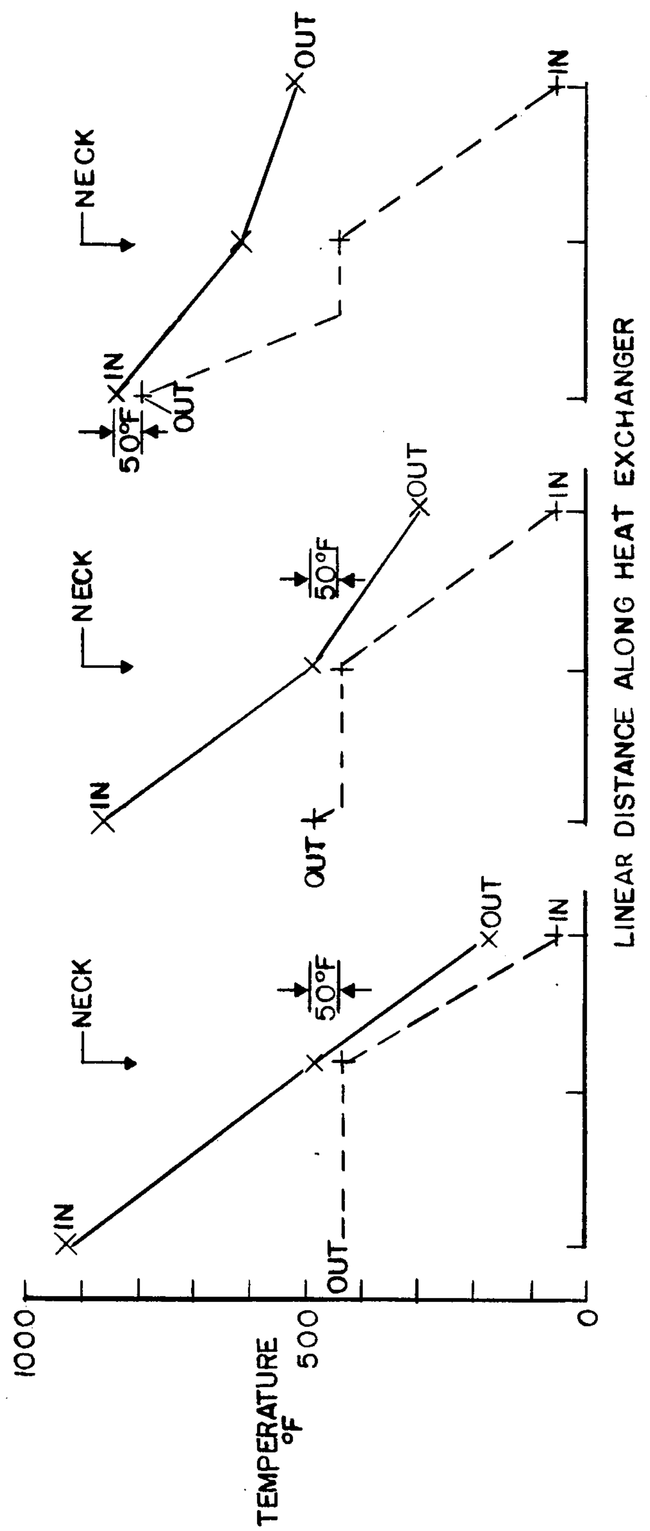
FIG. 31 illustrates the effect of three different air-fuel ratios on the heat exchanger.

The set of parametric data given in FIGS. 29, 30 and 31 serve to illustrate the limitations of the conventional heat exchanger integrated into a regenerative parallel compound dual-fluid cycle powerplant. Turbine inlet temperature is set at 2150° F., compressor pressure ratio is set at 27:1 and the air-fuel ratio in the combustor is the independent variable. Component assumptions are identical to those given earlier.

As the air-fuel ratio increases from stoichiometric (15) to 41.3, efficiency increases from 46.7% to 52.0% at the peak; but at higher air-fuel ratios (or lower SHIR) efficiency drops rapidly (FIG. 29). To maintain the turbine inlet temperature at 2150° F. while increasing the air-fuel ratio (or decreasing SHIR), the steam-air ratio drops markedly from 0.62 to 0.12. As a result, power throughput is reduced by a factor of more than two - from 760 to 330 hp/lb/sec.

FIG. 30 shows how temperatures change on both sides of the heat exchanger as air-fuel ratio is increased. The steam quality at the heat exchanger discharge is also shown on this figure.

FIG. 31 shows the effect of three different conditions of combustor air-fuel ratio — 20, 35 and 45 on the heat exchanger. Note that two limitations have been stipulated for the heat exchanger: the neck temperature on the gas mixture side is assumed to be at least 50° F. greater than the water boiling temperature, and the steam discharge temperature is assumed to be at least 50° F. less than the gas mixture temperature entering the heat exchanger.

Referring to both FIGS. 30 and 31, consider the conditions at air-fuel ratio = 20. Here the gas mixture discharge temperature is at the saturation temperature of the steam in the mixture. This is the situation assumed for all the data given in FIG. 27. Wet steam leaves the heat exchanger having a quality of 0.64 and the gas mixture neck temperature is set at the limit 50° F. greater than the water boiling temperature.

At an air-fuel ratio of 35, the gas mixture must discharge at a temperature of 300° F., which is 155° F. greater than the saturation temperature of steam in the mixture. This elevated discharge temperature is necessary to balance the heat in the low temperature end of the heat exchanger. The gas mixture neck temperature is unchanged but superheated steam is discharged from the heat exchanger at 480° F. Even at an elevated temperature at the heat exchanger exit, the rejected heat is less per pound of working fluid than other engine cycles.

At an air-fuel ratio of 45, the hot end temperature limit has been reached and the discharge superheated steam is exactly 50° F. below the gas mixture inlet temperature. To balance the heat on the high temperature end of the heat exchanger, at the neck the temperature increases to 610° F., and this forces the gas mixture discharge temperature of the heat exchanger exit up rapidly to 515° F. to balance the heat on the low temperature end. It is obvious that waste heat is not recovered sufficiently in this case. Hence, one rejects too much heat again. The combination of limits at both the neck and hot ends have degraded the cycle performance significantly as shown in the thermal efficiency curve on FIG. 29. Note that the break point in efficiency on this curve occurs precisely at the point where the steam discharge temperature is first limited (air-fuel ratio = 41.3); and the steam temperature or the degree of supperheat of steam out of the heat exchanger reaches a peak. It becomes lower on both sides of that point. This again points out the dependent nature of cycle parameters.

Cycle conditions for this example were intentionally selected to correspond to a point on the maximum efficiency line for the ideal data shown on FIG. 27b (curve E—E). Note that the neck limitation of a conventional heat exchanger has reduced the efficiency from 55% to 52%.

In summary, the dual fluid heat engine of the present invention provides very high thermal efficiency while throughput remains remarkably high. The result for a powerplant installation is reduced fuel consumption and therefore reduced operating cost coupled with reduced powerplant size for a given power output and herefore lower initial cost compared with, for example, a combined cycle engine.

AN EXAMPLE OF DUAL FLUID CYCLE ENGINE DESIGN

The Cheng cycle engine design is complicated because the mass flow through the air compressor is very different from the mass flow through the turbine. Because there are a number of variables in a Cheng cycle engine, some freedom for the engine design does exist. The following example sets forth typical steps to allow an engine designer to obtain, quickly, engine parameters before a detailed component map matching and final computation of such an engine is made.

(1) Engine size: The first order of importance is to know what power output range is required for the engine. Unfortunately, the component size cannot be picked until the end of this procedure.

(2) Selection of the Turbine Inlet Temperature (TIT): The Cheng cycle engine generally performs better at high TIT, but the cooling methods have to be determined first. If saturated steam is used to cool the first nozzle bank and turbine blades, then the mass flow rate for cooling is generally much smaller than that of using the bleed air from the compressor. This efficient cooling method allows a higher TIT than a gas turbine. Since some aircraft gas turbines are capable of operating at TIT 2450° F. with air bleed cooling, for illustrative purposes, let us use TIT = 2500° F.

(3) Compression ratio (CPR): Compession ratio is related to the cost of the compressor. Referring to FIG. 9, one can see that if CPR = 40, the efficiency is only 1% better than for CPR = 30. But the cost of the compressor at CPR = 40 is more than 20% higher than for a compressor with a CPR = 30, so let us assume CPR = 30 would fit the desired need. The compressor efficiency can influence the engine performance. However, this influence is minimized on the Cheng cycle engine, so compressor efficiency of 84% is assumed acceptable.

Figure 12:
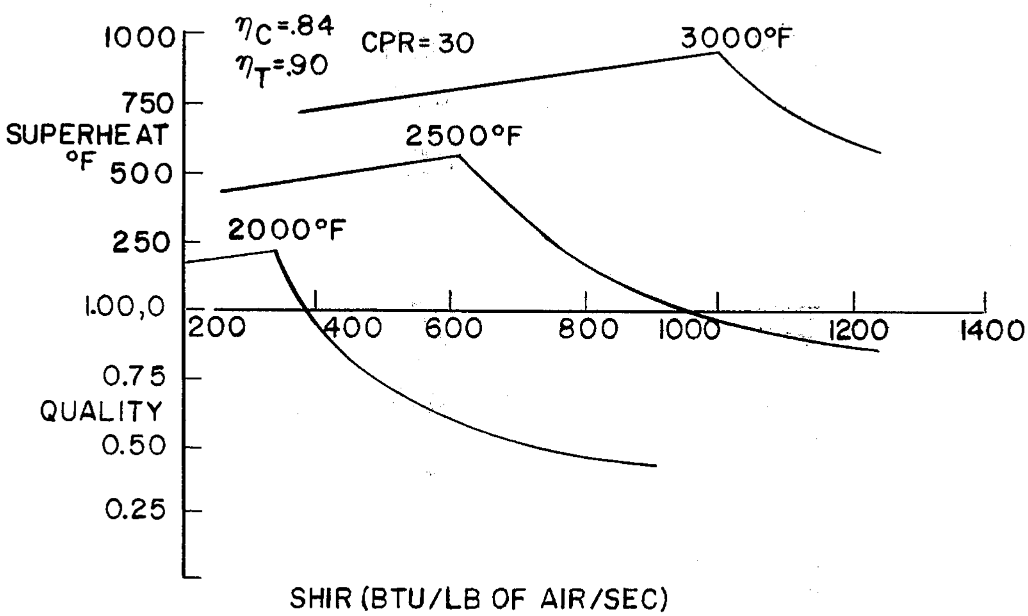
Figure 13:
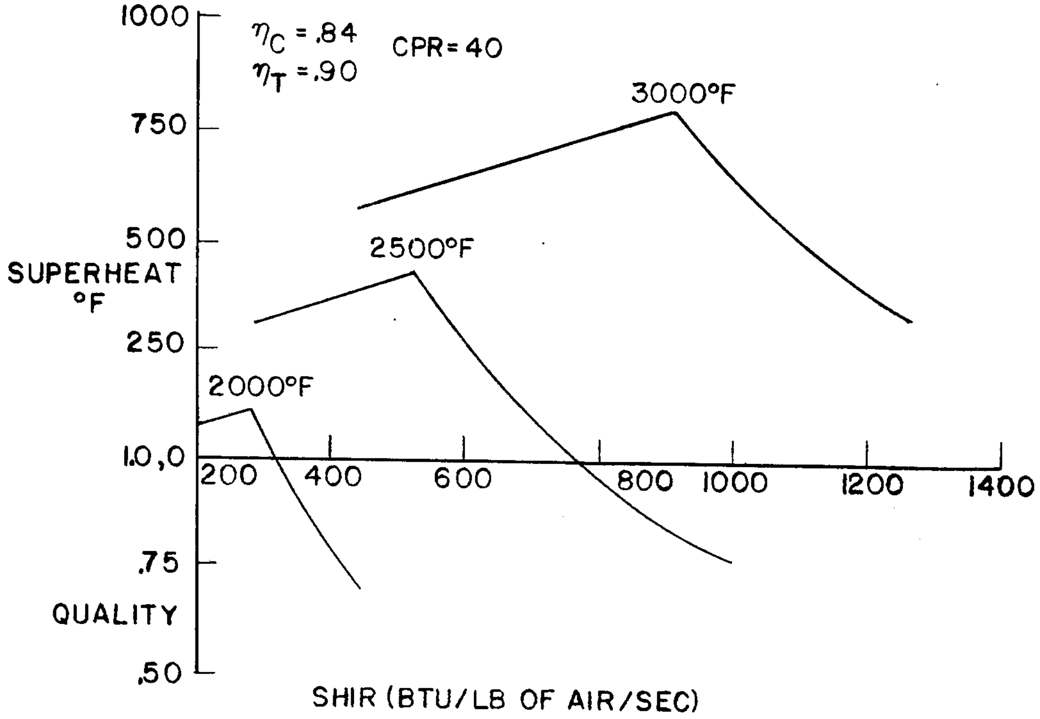

(4) Degree of Superheat of Steam and Operative Points: It is a standard engineering practice that the design point is always slightly away from the peak point. In this case, one would pick SHIR = 640 Btu/lb air (FIG. 9) or approximately 460° F. of superheat (FIG. 12). This allows a larger temperature difference in the heat exchanger relative to the hot end which gains a little better throughput (hp/lb. air/sec.).

Figure 7:
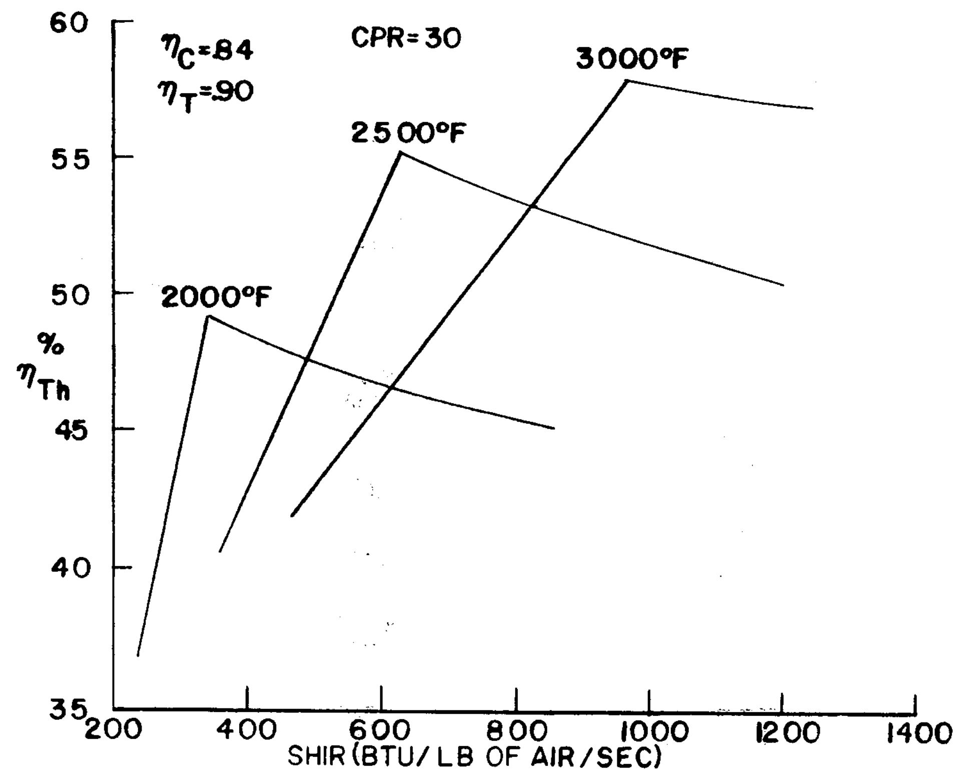
Figure 8:
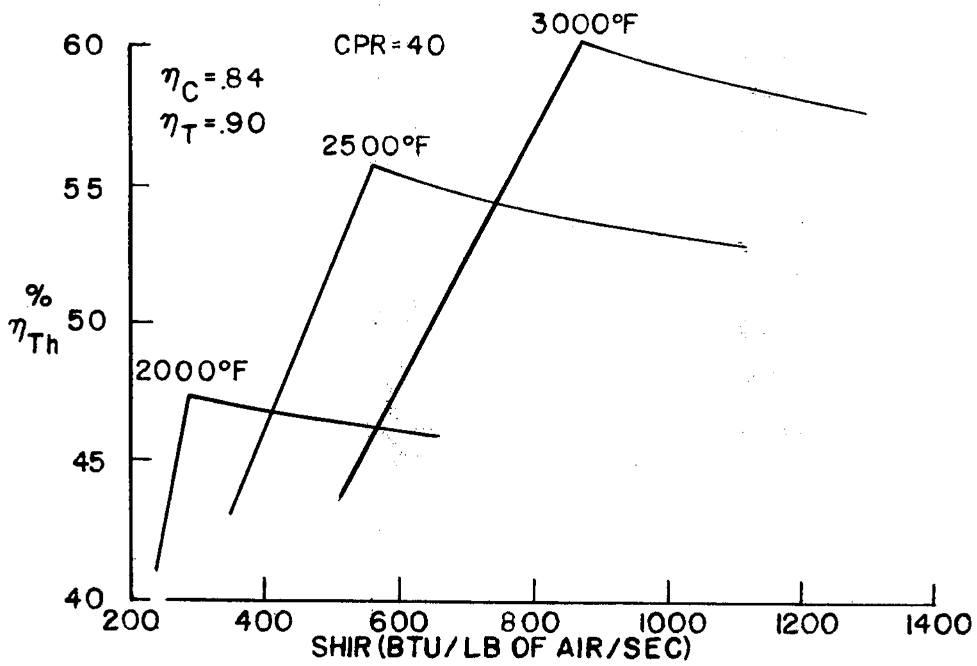

A cross check with FIG. 7 shows that the efficiency is only a quarter percent lower than the peak efficiency. Thus, SHIR = 640 has been determined. If the heating source is a nuclear reactor, one can design the reactor surface to supply SHIR = 640 BTU/lb. air. If it is burning oil, then the fuel flow rate is convertible as $w_f$ = 640/18600 = SHIR/low heating value of fuel = 0.0344 lb. fuel/lb. air.

(5) Steam to Air Ratio: With TIT = 2500° F., CPR = 30 and SHIR = 640 Btu/lb. air, one can consult FIG. 17 and see that the XMIX would be 0.175 lb. steam/lb. air. Therefore, for 1 lb./sec. airflow through the air compressor, the turbine would have to pass 1 + $w_f$ + XMIX lb/sec. mixture flow. For this case, it is equal to 1 + 0.0344 + 0.175 = 1.2094 lb./sec. mixture. The steam to fuel ratio is 5.0872 lb. steam/lb. fuel.

(6) Selection of Component Sizes: If the engine is designed to produce 10,000 Hp at peak output, from FIG. 22, the throughput, T.P., is 490 Hp/lb. air/sec. So the compressor size is the ratio of engine output, 10,000 Hp, divided by T.P. 490 Hp/lb. air/sec. or 20.41 lb./sec. at CPR = 30. The turbine flow rate would be 24.68 lb./sec. mixture flow. With the major components selected, one can proceed to pick available components having performance close to this requirement or design components to fit this requirement. With a refined component mapping, one can then begin to predict off peak load characteristics.

This engine would have thermal efficiency in the neighborhood of 55% and a thoughput of 490 Hp/lb. air/sec. This can be compared with a practical ultra high temperature (TIT = 2800° F.) combined cycle system of 50.4% thermal efficiency with a throughput of 325 Hp/lb. air/sec. Hence, this engine becomes far superior in efficiency and throughput to the combined cycle.

The physical configuration of a heat engine incorporating the principles of the Cheng cycle which has been described herein represents a preferred embodiment but by no means the only configuration which can be used. To those skilled in the art, it will be apparent that other configurations of, additions to, or substitution of engine components can be used. Also, if efficiency is unimportant to the designer, as where economic considerations are paramount, the design of the heat engine can be expected to vary considerably from the configuration described herein. In other words, the Cheng cycle, as described herein, sets forth a relationship between engine parameters of a dualfluid engine for maximum efficiency and/or throughput. It is possible, within the teaching of the Cheng cycle, to build other physical configurations for effectuating these relationships and it is also possible to design and build an engine which operates away from peak efficiency operation which is described here.

I claim:

1. A dual working fluid heat engine for operation in a range encompassing from maximum efficiency to maximum throughput comprising:

(a) a combustion chamber;

(b) turbine means for converting the energy of working fluids passing through it to mechanical work;

(c) compressor means for introducing a first reactant comprising air into said combustion chamber, said compressor means having a pressure ratio (CPR) falling within an approximate region of values dependent upon the temperature of the working fluids at the inlet to said turbine means (TIT) according to the following relationship:

$$(CPR)_{mean} \cong -21.25 + 21.14(TIT/1000) + 3(TIT/1000)^2 - 1.667(TIT/1000)^3$$

for 1500° F. ≦ TIT ≦ 3000° F.

The upper bound of this region is:

$$(CPR)_{upper_1} \cong (CPR)_{mean} \times 1.5 \text{ for } 1500° \text{ F.} \leqq TIT < 1600° \text{ F.}$$

$$(CPR)_{upper_2} \cong (CPR)_{mean} \times 1.4 \text{ for } 1600° \text{ F.} \leqq TIT < 2200° \text{ F.}$$

$$(CPR)_{upper_3} \cong (CPR)_{mean} \times 1.3 \text{ for } 2200° \text{ F.} \leqq TIT < 3000° \text{ F.}$$

The lower bound of this region is:

$$(CPR)_{lower_1} \cong 4.0 \text{ for } 1500° \text{ F.} \leqq TIT < 2000° \text{ F.}$$

$$(CPR)_{lower_2} \cong (CPR)_{mean}/1.4 \text{ for } 2000° \text{ F.} \leqq TIT < 3000° \text{ F.}$$

(d) means for introducing a second reactant comprising a hydrocarbon fuel under pressure into said combustion chamber for combustion with said first reactant wherein the ratio of the first raactant to the second reactant (AFR) is dependent upon the compressor means pressure ratio and temperature of the working fluids at the inlet to said turbine means, and wherein the ratio falls within an approximate range according to the following relationship:

$$(AFR)_{mean} \cong 209.96 - 170.90(TIT/1000) + 52.93(TIT/1000)^2 - 5.81(TIT/1000)^3 \text{ for } 1500° F. \leqq TIT \leqq 3000° F.$$

The upper bound of this region is:

$$(AFR)_{upper_1} \cong (AFR)_{mean} \times 1.4 \text{ for } 1500° F. \leqq TIT \leqq 3000° F.$$

The lower bound of this region is:

$$(AFR)_{lower_1} \cong (AFR)_{mean}/1.4 \text{ for } 1500° F. \leqq TIT < 2000° F.$$

$$(AFR)_{lower_2} \cong (AFR)_{mean}/1.5 \text{ for } 2000° F. \leqq TIT \leqq 2500° F.$$

$$(AFR)_{lower_3} \cong 15.0 \text{ for } 2500° F. \leqq TIT \leqq 3000° F.$$

(e) means of introducing a fluid comprising water in a vapor state into the said heat engine combustion chamber at a ratio of water to the combustion products by weight (XMIX) dependent upon the compressor means pressure ratio, the temperature of the working fluids at the inlet to said turbine means, and the ratio of the first reactant to the second reactant and wherein the ratio falls within an approximate range according to the following relationship: Ti, $(XMIX)_{mean} \cong 0.20 + 0.0643(TIT/1500)$ for 1500° F. TIT 3500° F.

The upper bound for this region is:

$$(XMIX)_{upper} \cong 0.3 + .0167(TIT/1500° F.)$$

The lower bound of this region is:

$$(XMIX)_{lower_1} \cong 0.1 \text{ for } 1500° F. < TIT < 3500° F.$$

whereby the said vapor is further heated by heat transfer through rapid and turbulent mixing with the heated combustion products;

(f) means fo utilizing part of the mechanical work generated by said expander means to power said compressor means;

(g) means for extracting useful work from said expander means; and (h) means for transferring residual thermal energy from said mixture of vapor and combustion products to said water to thereby preheat the same to a super-heated vapor, XMIX being chosen to generally maximize the temperature of the superheated water vapor in degrees of superheat, for a given value of TIT, and wherein the CPR is chosen to generally maximize the transfer of the residual thermal energy to said water for a given value of TIT.

2. A dual fluid heat engine as in claim 1 for maximum efficiency wherein said vapor is preheated to above about 250° F. super-heat prior to its introduction within said combustion chamber.

3. In a dual working fluid heat engine for operation in a range encompassing from maximum efficiency to maximum throughout comprising:

(a) a combustion chamber;

(b) compressor means for introducing a first reactant comprising air into said combustion chamber, said compressor means having a predetermined pressure ratio (CPR);

(c) means for introducing a second reactant comprising a hydrocarbon fuel into said combustion chamber for combustion with said first reactant, at a defined air/fuel ratio (AFR);

(d) means for introducing water in the form of a vapor within said combustion chamber at a defined water/air ratio (XMIX) whereby the water vapor is further heated by heat transfer through rapid and turbulent mixing with the heated combustion products;

(e) turbine means responsive to the mixture of said vapor and combustion products for converting the energy associated with the mixture to mechanical energy, the temperature of said mixture entering said turbine means defining the turbine inlet temperature (TIT); and (f) means for transferring residual thermal energy from said mixture of vapor and combustion products to said water to thereby preheat the same prior to its introduction within said combustion chamber, XMIX being chosen to generally maximize the temperature of the superheated water vapor in degrees of superheat for a given value of TIT, and wherein the CPR is chosen to generally maximize the transfer of the residual thermal energy to said water for a given value of TIT wherein the improvement comprises means for linking the heat engine parameters of turbine inlet temperature, pressure ratio, air/fuel ratio and water/air ratio to encompass the range from maximum efficiency to maximum throughput, where for a given turbine inlet temperature the remaining parameters fall within about the following proscribed boundaries:

$$(CPR)_{mean} \cong -21.25 + 21.14(TIT/1000) + 3(TIT/1000)^2 - 1.667(TIT/1000)^3$$

for 1500° F. ≦ TIT ≦ 3000° F.

The upper bound of this region is:

$$(CPR)_{upper_1} \cong (CPR)_{mean} \times 1.5 \text{ for } 1500° F. \leqq TIT < 1600° F.$$

$$(CPR)_{upper_2} \cong (CPR)_{mean} \times 1.4 \text{ for } 1600° F. \leqq TIT < 2200° F.$$

$$(CPR)_{upper_3} \cong (CPR)_{mean} \times 1.3 \text{ for } 2200° F. \leqq TIT < 3000° F.$$

The lower bound of this region is:

$$(CPR)_{lower_1} \cong 4.0 \text{ for } 1500° F. \leqq TIT < 2000° F.$$

$$(CPR)_{lower_2} \cong (CPR)_{mean}/1.4 \text{ for } 2000° F. \leqq TIT < 3000° F.$$

$$(AFR)_{mean} \cong 209.96 - 170.90(TIT/1000) + 52.93(TIT/1000)^2 - 5.81(TIT/1000)^3 \text{ for } 1500° F. \leqq TIT \leqq 3000° F.$$

The upper bound of this region is:

$$(AFR)_{upper_1} \cong (AFR)_{mean} \times 1.4 \text{ for } 1500° F. \leqq TIT \leqq 3000° F.$$

The lower bound of this region is:

$(AFR)_{lower_1} \cong (AFR)_{mean}/1.4$ for 1500° F. $\leqq$ TIT $<$ 2000° F.

$(AFR)_{lower_2} \cong (AFR)_{mean}/1.5$ for 2000° F. $\leqq$ TIT $\leqq$ 2500° F.

$(AFR)_{lower_3} \cong 15.0$ for 2500° F. $\leqq$ TIT $\leqq$ 3000° F.

$(XMIX)_{mean} \cong 0.20 + 0.0643(TIT/1500)$ for 1500° F. $\leqq$ TIT $\leqq$ 3500° F.

The upper bound for this region is:

$(XMIX)_{upper} \cong 0.3 + .0167(TIT/1500° F.)$

The lower bound of this region is:

$(XMIX)_{lower_1} \cong 0.1$ for 1500° F. $<$ TIT $<$ 3500° F.

and wherein the temperature of the water vapor after said heat transfer prior to being introduced into the combustion chamber is the super-heat range.

4. A dual fluid heat engine as in claim 3 for maximum efficiency wherein said vapor is preheated to above about 250° F. super-heat prior to its introduction within said combustion chamber.

5. In a dual fluid heat engine comprising:

(a) a chamber;

(b) compressor means for introducing a first gaseous working fluid comprising air into said chamber, said compressor means having a predetermined pressure ratio (CPR);

(c) means for heating said gaseous working fluid in said chamber at a defined specific heat input rate (SHIR);

(d) means for introducing a second working fluid comprising water in the form of a vapor within said chamber at a defined water/air ratio (XMIX) whereby the water vapor is further heated by heat transfer through rapid and turbulent mixing with the heated vapor working fluid;

(e) turbine means responsive to the mixture of said first and second working fluid for converting the energy associated with the mixture to mechanical energy, the temperature of said mixture entering said turbine means defining the turbine inlet temperature (TIT);

(f) means for transferring residual thermal energy from said mixture of first and second working fluids to said water to thereby preheat the same to the vapor state prior to its introduction within said chamber; and (g) wherein the improvement comprises means for linking the heat engine parameters of turbine inlet temperature, pressure ratio, specific heat input rate and water/air ratio to obtain high values of engine efficiency and/or throughput, where for a given turbine inlet temperature the remaining parameters fall within the following proscribed boundaries:

$(CPR)_{mean} \cong -21.25 + 21.14(TIT/1000) + 3(TIT/1000)^2 - 1.667(TIT/1000)^3$ for 1500° F. $\leqq$ TIT $\leqq$ 3000° F.

The upper bound of this region is:

$(CPR)_{upper_1} \cong (CPR)_{mean} \times 1.5$ for 1500° F. $\leqq$ TIT $<$ 1600° F.

$(CPR)_{upper_2} \cong (CPR)_{mean} \times 1.4$ for 1600° F. $\leqq$ TIT $<$ 2200° F.

$(CPR)_{upper_3} \cong (CPR)_{mean} \times 1.3$ for 2200° F. $\leqq$ TIT $<$ 3000° F.

The lower bound of this region is:

$(CPR)_{lower_1} \cong 4.0$ for 1500° F. $\leqq$ TIT $<$ 2000° F.

$(CPR)_{lower_2} \cong (CPR)_{mean}/1.4$ for 2000° F. $\leqq$ TIT $<$ 3000° F.

$XMIX \cong 0.178 + 0.0268(SHIR/400\ Btu/lb\ air)^{2.05} \pm 0.1$ where $$(SHIR)_{mean} \cong \frac{10^3 \text{Btu/lb of air}}{11.18 - 9.188\left(\frac{TIT}{1000}\right) + 2.846\left(\frac{TIT}{1000}\right)^2 - 0.312\left(\frac{TIT}{1000}\right)^3}$$

for 1500° F. $\leqq$ TIT $\leqq$ 3000° F.

The lower bound of SHIR in this region is $SHIR_{lower} \cong (SHIR)_{mean}/1.4$ for 1500° F. $\leqq$ TIT $\leqq$ 3000° F.

The upper bound of SHIR in this region is:

$SHIR_{upper_1} \cong 1.4 \times (SHIR)_{mean}$ for 1500° F. $\leqq$ TIT $\leqq$ 2000° F.

$SHIR_{upper_2} \cong 1.5 \times (SHIR)_{mean}$ for 2000° F. $\leqq$ TIT $\leqq$ 2500° F.

$SHIR_{upper_3} \geqq 1240$ Btu/lb for TIT $\geqq$ 2500° F.

6. A dual fluid heat engine as in claim 5 for maximum efficiency wherein said vapor is preheated to above about 250° F. superheat prior to its introduction within said combustion chamber.

7. The heat engine of claim 5 wherein maximum engine efficiency is obtained wherein XMIX, within the proscribed region, is selected to maximize the degree of superheat of the water vapor entering said chamber.

8. The heat engine of claim 5 wherein XMIX is selected to be equal to or greater than XMIX at peak water vapor superheat for a compromise between the maximum engine efficiency and throughput, provided that SHIR $\leqq 2 \times$ SHIR at peak water vapor superheat.

9. The heat engine of claim 8 wherein the CPR is chosen from a range which results in the water vapor temperature entering the chamber to fall within the range of 250° F. to 800° F. superheat.

10. The method of designing a dual fluid engine having a chamber, compressor means for introducing a first reactant comprising air into said chamber, said compressor means having a predetermined pressure ratio (CPR), means for heating said gaseous working fluid in said combustion chamber at a defined specific heat input rate, means for introducing water in the form of a vapor within said combustion chamber at a defined water/air ratio (XMIX) whereby the water vapor is further heated by heat transfer through rapid and turbulent mixing with the vapor working fluid, turbine means responsive to the mixture of said first and second working fluids products for converting the energy associated with the mixture to mechanical energy, the temperature of said mixture entering said turbine means defining the turbine inlet temperature (TIT), and means for transferring residual thermal energy from said exhausted mixture of first and second working fluids products to said water to thereby preheat the same to a superheated vapor state prior to its introduction within said combustion comprising the steps of:

(a) selecting a value for the CPR to generally maximize transfer of the residual thermal energy, dependent on the TIT, within a range determined by the following boundaries:

$$(CPR)_{mean} \cong -21.25 + 21.14(TIT/1000) + 3(TIT/1000)^2 - 1.667(TIT/1000)^3$$

for 1500° F. ≦ TIT ≦ 3000° F.

The upper bound of this region is:

$$(CPR)_{upper_1} \cong (CPR)_{mean} \times 1.5 \text{ for } 1500° \text{ F.} \leqq TIT < 1600° \text{ F.}$$

$$(CPR)_{upper_2} \cong (CPR)_{mean} \times 1.4 \text{ for } 1600° \text{ F.} \leqq TIT < 2200° \text{ F.}$$

$$(CPR)_{upper_3} \cong (CPR)_{mean} \times 1.3 \text{ for } 2200° \text{ F.} \leqq TIT < 3000° \text{ F.}$$

The lower bound of this region is:

$$(CPR)_{lower_1} \cong 4.0 \text{ for } 1500° \text{ F.} \leqq TIT < 2000° \text{ F.}$$

$$(CPR)_{lower_2} \cong (CPR)_{mean}/1.4 \text{ for } 2000° \text{ F.} \leqq TIT < 3000° \text{ F.}$$

(b) selecting values for XMIX with XMIX being chosen to fall within a range which includes the value of XMIX where it is equal to or greater than that required to maximize the temperature of the superheated water vapor in degrees of superheat, for a given value of TIT, said range determined by:

$$XMIX \cong 0.178 + 0.0268(SHIR/400 \text{ Btu/lb air})^{2.05} \pm 0.1$$

where $$(SHIR)_{mean} \cong \frac{10^3 \text{Btu/lb of air}}{11.18 - 9.188\left(\frac{TIT}{1000}\right) + 2.846\left(\frac{TIT}{1000}\right)^2 - 0.312\left(\frac{TIT}{1000}\right)^3}$$

for 1500° F. ≦ TIT ≦ 3000° F.

The lower bound of SHIR in this region is $$SHIR_{lower} \cong (SHIR)_{mean}/1.4 \text{ for } 1500° \text{ F.} \leqq TIT \leqq 3000° \text{ F.}$$

The upper bound of SHIR in this region is:

$$SHIR_{upper_1} \cong 1.4 \times (SHIR)_{mean} \text{ for } 1500° \text{ F.} \leqq TIT \leqq 2000° \text{ F.}$$

$$SHIR_{upper_2} \cong 1.5 \times (SHIR)_{mean} \text{ for } 2000° \text{ F.} \leqq TIT \leqq 2500° \text{ F.}$$

$$SHIR_{upper_3} \geqq 1240 \text{ Btu/lb for } TIT \geqq 2500° \text{ F.}$$

11. The method of claim 10 including the step of injecting water vapor into said chamber at a temperature of at least 250° F. superheat, for maximum engine efficiency.

12. In a dual fluid heat engine comprising:

(a) a chamber;

(b) compressor means for introducing a first gaseous working fluid into said chamber, said compressor means having a predetermined pressure ratio (CPR);

(c) means for introducing a second liquid-vapor working fluid in the form of a vapor within said chamber at a defined second/first working fluid ratio (XMIX);

(d) means for heating said first gaseous working fluid and said second working fluid in the vapor form in said chamber at a defined specific heat input rate (SHIR);

(e) turbine means responsive to the mixture of said first and second working fluids for converting the energy associated with the mixture to mechanical energy, the temperature of said mixture entering said turbine means defining the turbine inlet temperature (TIT);

(f) counterflow heat exchanger means for transferring residual thermal energy from said exhausted mixture of first and second working fluids to said incoming second working fluid to thereby preheat the same to a superheated vapor state prior to its introduction within said chamber, XMIX is chosen to be substantially equal to or greater than $XMIX_{peak}$, where $XMIX_{peak}$ occurs at the minimum effective temperature, $T_{eff}$, of said mixture, where $$T_{eff} = \frac{C_{P_{gas}} T_s + XMIX[h_1(T_{s_1}) + h_{fg}(T_{s_1} P_s) + h_v(T_s P_s)]}{C_{P_{gas}}(1 + XMIX)}$$

$C_{P_{gas}}$ = specific heat at constant pressure of the first working fluid $T_s$ = sensible temperature of the mixture $h_1$ = liquid phase enthalpy; Btu/lb $h_{fg}$ = latent heat of evaporation; Btu/lb $P_s$ = pressure of second working fluid in the superheat state $h_v$ = enthalpy of second working fluid in the superheat state wherein the CPR is chosen to generally maximize the transfer of the residual thermal energy to said water for a given value of TIT.

13. The heat engine of claim 12 wherein CPR is chosen to fall into a range bounded by the value of CPR for which maximum transfer of residual thermal energy occurs, and a value which is not less than one-third of this value.

14. A heat engine as in claim 13 wherein SHIR falls within a range bounded by the value of SHIR at peak efficiency and 2 × SHIR at peak efficiency.

15. In a dual fluid heat engine comprising:

(a) a chamber;

(b) compressor means for introducing a first gaseous working fluid comprising air into said chamber, said compressor means having a predetermined pressure ratio (CPR);

(c) means for heating said first gaseous working fluid in said chamber at a defined specific heat input rate (SHIR);

(d) means for introducing a second working fluid comprising water in the form of a vapor within said chamber at a defined second/first working fluid ratio (XMIX) whereby the water vapor is further heated by heat transfer through rapid and turbulent mixing with the heated vapor working fluid;

(e) turbine means responsive to the mixture of said first and second working fluids for converting the energy associated with the mixture to mechanical energy, the temperature of said mixture entering said turbine means defining the turbine inlet temperature (TIT);

(f) counterflow heat exchanger means for transferring residual thermal energy from said exhausted mixture of first and second working fluids to said incoming second working fluid to thereby preheat the same to a superheated vapor state prior to its introduction within said chamber, XMIX is chosen to be substantially equal to or greater than $XMIX_{peak}$, where $XMIX_{peak}$ occurs at the minimum effective temperature, $T_{eff}$, of said mixture, where $$T_{eff} = \frac{C_{P_{gas}} T_s + XMIX[h_1(T_{s_1}) + h_{fg}(T_{s_1} P_s) + h_v(T_s P_s)]}{C_{P_{gas}}(1 + XMIX)}$$

$C_{P_{gas}}$ = specific heat at constant pressure of the first working fluid $T_s$ = sensible temperature of the mixture $h_l$ = liquid phase enthalpy; Btu/lb $h_{fg}$ = latent heat of evaporation; Btu/lb $P_s$ = pressure of second working fluid in the superheat state $h_v$ = enthalpy of second working fluid in the superheat state wherein the CPR is chosen to generally maximize the transfer of the residual thermal energy to said water for a given value of TIT.

16. The heat engine of claim 15 wherein CPR is chosen to fall into a range bounded by the value of CPR for which maximum transfer of residual thermal energy occurs, and the value is not less than one-third of this value.

17. A heat engine as in claim 16 wherein SHIR falls within a range bounded by the value of SHIR at peak efficiency and 2 × SHIR at peak efficiency.

18. A heat engine as in claim 1 including means for recovering and condensing back water into a liquid from said intermixed vapor and combustion products and means for purifying said condensed liquid water for reuse within said heat engine.

19. A heat engine as in claim 3 including means for recovering and condensing back water into a liquid from said intermixed vapor and combustion products and means for purifying said condensed liquid water for reuse within said heat engine.

20. A heat engine as in claim 5 including means for recovering and condensing back water into a liquid from said intermixed vapor and combustion products and means for purifying said condensed liquid water for reuse within said heat engine.

21. A heat engine as in claim 1 including means for separating and recovering each of said working fluids.

22. A heat engine as in claim 12 including means for separating and recovering each of said working fluids.

23. A heat engine as in claim 15 including means for separating and recovering each of said working fluids.

* * * * *